United States Patent
Li et al.

(10) Patent No.: US 11,219,020 B2
(45) Date of Patent: Jan. 4, 2022

(54) DETERMINATION OF DATA TRANSMISSION RESOURCES

(71) Applicant: HUAWEI TECHNOLOGIES CO., LTD., Guangdong (CN)

(72) Inventors: Chaojun Li, Beijing (CN); Sha Ma, Beijing (CN); Zuomin Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 16/734,879

(22) Filed: Jan. 6, 2020

(65) Prior Publication Data

US 2020/0146004 A1    May 7, 2020

Related U.S. Application Data

(63) Continuation of application No. 15/892,197, filed on Feb. 8, 2018, now Pat. No. 10,555,301, which is a
(Continued)

(51) Int. Cl.
*H04W 72/04* (2009.01)
*H04L 5/00* (2006.01)
(Continued)

(52) U.S. Cl.
CPC ........ *H04W 72/0446* (2013.01); *H04B 1/713* (2013.01); *H04L 5/0044* (2013.01);
(Continued)

(58) Field of Classification Search
CPC . H04W 72/00; H04W 72/04; H04W 72/0446; H04W 72/042; H04W 72/0426;
(Continued)

(56) References Cited

U.S. PATENT DOCUMENTS 9,020,517 B2    4/2015    Kim et al.
10,172,151 B2   1/2019    Hammarwall et al.
(Continued)

FOREIGN PATENT DOCUMENTS

CN    101414870    4/2009
CN    102970124 A  3/2013
(Continued)

OTHER PUBLICATIONS

Ericsson et al., "New SI proposal: Study on Latency reduction techniques for LTE," 3GPP TSG RAN Meeting #67 RP-150465, Shanghai, China, Mar. 9-12, 2015, 8 pages.
(Continued)

*Primary Examiner* — Warner Wong
(74) *Attorney, Agent, or Firm* — Fish & Richardson P.C.

(57) ABSTRACT

The present disclosure relates to data transmission methods, apparatus, and systems. One example base station includes at least one processor and a transceiver. The at least one processor is configured to determine a data transmission resource, where the data transmission resource includes a time-domain transmission resource and a frequency-domain transmission resource. The transceiver is configured to send downlink control information (DCI) to a terminal device, where the DCI indicates the time-domain transmission resource, and perform data transmission with the terminal device on the data transmission resource.

20 Claims, 5 Drawing Sheets

Related U.S. Application Data continuation of application No. PCT/CN2015/086794, filed on Aug. 12, 2015.

(51) Int. Cl.
  *H04B 1/713* (2011.01)
  *H04L 12/70* (2013.01)

(52) U.S. Cl.
  CPC .......... H04L 5/0053 (2013.01); H04L 5/0091 (2013.01); H04W 72/04 (2013.01); H04W 72/042 (2013.01); *H04L 5/0007* (2013.01); *H04L 2012/5631* (2013.01)

(58) Field of Classification Search
  CPC . H04W 72/1274; H04W 28/16; H04W 28/26; H04B 1/713; H04L 5/0053; H04L 5/0091; H04L 5/0007; H04L 5/0044; H04L 2012/5631; H04L 29/02; H04L 29/06183; H04L 29/0619; H04L 65/10; H04L 47/70; H04L 12/5692
  See application file for complete search history.

(56) References Cited

U.S. PATENT DOCUMENTS

| | | | |
|---|---|---|---|
| 10,555,301 B2 | 2/2020 | Li et al. | |
| 2007/0036067 A1 | 2/2007 | Zhang et al. | |
| 2012/0113920 A1* | 5/2012 | Cheng | H04W 52/325 370/329 |
| 2012/0170510 A1 | 7/2012 | Kim et al. | |
| 2012/0327884 A1* | 12/2012 | Seo | H04W 52/244 370/329 |
| 2013/0114525 A1 | 5/2013 | Ahmadi et al. | |
| 2013/0121274 A1 | 5/2013 | Chen et al. | |
| 2013/0188577 A1* | 7/2013 | Papasakellariou | H04L 1/0038 370/329 |
| 2013/0223366 A1* | 8/2013 | Papasakellariou | H04L 5/0094 370/329 |
| 2014/0056244 A1* | 2/2014 | Frenne | H04W 72/1289 370/329 |
| 2014/0293922 A1* | 10/2014 | Wang | H04W 72/042 370/329 |
| 2014/0293924 A1* | 10/2014 | Wang | H04W 72/042 370/329 |
| 2015/0163774 A1 | 6/2015 | Chen et al. | |
| 2015/0230210 A1* | 8/2015 | Lee | H04L 5/0007 370/329 |
| 2015/0230234 A1 | 8/2015 | Choi et al. | |
| 2015/0237604 A1* | 8/2015 | Shi | H04W 76/27 370/330 |
| 2015/0237644 A1 | 8/2015 | Elbwart et al. | |
| 2015/0295688 A1* | 10/2015 | Pan | H04B 7/0671 370/329 |
| 2016/0088594 A1 | 3/2016 | Xiong et al. | |
| 2016/0119946 A1* | 4/2016 | Dai | H04L 5/0053 370/329 |
| 2016/0134458 A1 | 5/2016 | Xia et al. | |
| 2016/0135056 A1 | 5/2016 | Wu et al. | |
| 2017/0034846 A1 | 2/2017 | Seo et al. | |
| 2017/0105212 A1 | 4/2017 | Li et al. | |
| 2017/0164363 A1 | 6/2017 | Zhang et al. | |
| 2017/0245156 A1 | 8/2017 | Gou et al. | |
| 2017/0318564 A1 | 11/2017 | Lee et al. | |
| 2018/0109353 A1* | 4/2018 | Kwak | H04W 72/1273 |
| 2018/0110062 A1 | 4/2018 | Byun et al. | |
| 2018/0199322 A1* | 7/2018 | Takeda | H04W 72/044 |

FOREIGN PATENT DOCUMENTS

| | | |
|---|---|---|
| CN | 104025496 | 9/2014 |
| CN | 102594513 B | 1/2015 |
| CN | 104468030 | 3/2015 |
| EP | 2498516 A2 | 9/2012 |
| EP | 2509380 | 10/2012 |

OTHER PUBLICATIONS

International Search Report issued in International Application No. PCT/CN2015/086794 dated May 11, 2016, 6 pages.
Extended European Search Report issued in European Application No. 15900761.6 dated Jun. 22, 2018, 7 pages.
Office Action issued in Indian Application No. 201847005436 dated Jan. 27, 2021, 6 pages.

* cited by examiner

DETERMINATION OF DATA TRANSMISSION RESOURCES

CROSS-REFERENCE TO RELATED APPLICATIONS

This application is a continuation of U.S. patent application Ser. No. 15/892,197, filed on Feb. 8, 2018, which is a continuation of International Application No. PCT/CN2015/086794, filed on Aug. 12, 2015. All of the afore-mentioned patent applications are hereby incorporated by reference in their entireties.

TECHNICAL FIELD

The present invention relates to the field of wireless communications technologies, and in particular, to a data transmission method, an apparatus, and a system.

BACKGROUND

In a Long Term Evolution (LTE) system, data transmission between a base station and a terminal device is performed based on scheduling of the base station. Before receiving downlink data or sending uplink data, the terminal device receives scheduling information sent by the base station. The scheduling information may include a physical resource allocated to UE, for example, at least one of information about a time-frequency resource or information about a modulation and coding scheme configured for the UE. In addition, the base station may further add, to the scheduling information, information about a power control command related to uplink transmission of the UE. The scheduling information and the information about the power control command are collectively referred to as downlink control information (DCI).

In the LTE system, a transmission time interval (TTI) is a length of one subframe, that is, 1 ms. The base station only needs to send one piece of DCI in one subframe, to instruct the terminal device to receive or send one data packet (Packet data) with a TTI of 1 ms.

In the LTE system, a latency is one of important factors affecting user experience. Constantly emerging new services, such as a service related to the Internet of Vehicles, impose higher requirements on a latency. An existing transmission mechanism based on a TTI of one subframe or an existing transmission mechanism based on a TTI of 1 ms cannot satisfy a service latency requirement of a user.

SUMMARY

In view of this, embodiments of the present invention provide a data transmission method, an apparatus, and a system, to resolve a problem that a transmission mechanism based on a TTI of one subframe or a transmission mechanism based on a TTI of 1 ms cannot satisfy a service latency requirement of a user.

According to a first aspect, an embodiment of the present invention provides a base station, including:

a processing module, configured to determine a data transmission resource, where the data transmission resource is a short-TTI data transmission resource, and the short-TTI data transmission resource is less than a length of one subframe or is less than 1 ms in time domain; and a transceiver module, configured to: send DCI to a terminal device, where the DCI is used to indicate the data transmission resource; and perform data transmission with the terminal device on the data transmission resource.

With reference to the first aspect, in a first possible implementation, the data transmission resource includes a time-domain transmission resource, and the processing module is specifically configured to:

determine a time-domain pattern, and select, from multiple time-domain elements included in the determined time-domain pattern, one time-domain element as the time-domain transmission resource; or determine an starting symbol and a quantity of symbols of the time-domain transmission resource.

With reference to the first possible implementation of the first aspect, in a second possible implementation, the processing module is specifically configured to:

determine the time-domain pattern according to a system bandwidth, where a higher system bandwidth indicates a smaller quantity of symbols included in the selected time-domain element included in the time-domain pattern; or determine the time-domain pattern according to an available short-TTI data transmission bandwidth, where a higher available short-TTI data transmission bandwidth indicates a smaller quantity of symbols included in the selected time-domain element included in the time-domain pattern, and the available short-TTI data transmission bandwidth is a bandwidth that can be occupied by the short-TTI data transmission resource.

With reference to the first or the second possible implementation of the first aspect, in a third possible implementation, in the time-domain pattern:

each subframe includes two time-domain elements, a first time-domain element is located in the first slot, a second time-domain element is located in the second slot, and the time-domain elements do not include a symbol occupied by a legacy PDCCH; or each subframe includes four time-domain elements; for a normal cyclic prefix CP, a first time-domain element is a set of symbols whose sequence numbers are {#0, #1, #2, #3}, a second time-domain element includes a set of symbols whose sequence numbers are {#4, #5, #6}, a third time-domain element is a set of symbols whose sequence numbers are {#7, #8, #9, #10}, and a fourth time-domain element is a set of symbols whose sequence numbers are {#11, #12, #13}; for an extended CP, every three consecutive symbols form one time-domain element, a first time-domain element is a set of symbols whose sequence numbers are {#0, #1, #2}, a second time-domain element is a set of symbols whose sequence numbers are {#3, #4, #5}, a third time-domain element is a set of symbols whose sequence numbers are {#6, #7, #8}, and a fourth time-domain element is a set of symbols whose sequence numbers are {#9, #10, #11}; and the time-domain elements do not include a symbol occupied for transmitting a PDCCH; or for a normal CP, each subframe includes seven time-domain elements, and every two consecutive symbols form one time-domain element; for an extended CP, each subframe includes six time-domain elements, and every two consecutive symbols form one time-domain element; and the time-domain elements do not include a symbol occupied by a legacy PDCCH.

With reference to the first possible implementation of the first aspect, in a fourth possible implementation, the processing module is specifically configured to:

use a reference symbol as the starting symbol of the time-domain transmission resource, where the reference symbol is the first symbol occupied by the DCI, the last symbol occupied by the DCI, the $k^{th}$ symbol following the first symbol occupied by the DCI, or the $k^{th}$ symbol following the last symbol occupied by the DCI, and k is a positive integer; and determine, according to a system bandwidth, the quantity of symbols of the time-domain transmission resource, where a higher system bandwidth indicates a smaller quantity of occupied symbols; or determine, according to an available short-TTI data transmission bandwidth, the quantity of symbols of the time-domain transmission resource, where a higher available short-TTI data transmission bandwidth indicates a smaller quantity of occupied symbols, and the available short-TTI data transmission bandwidth is a bandwidth that can be occupied by the short-TTI data transmission resource.

With reference to any one of the first to the fourth possible implementations of the first aspect, in a fifth possible implementation, an information bit that is used to indicate the time-domain transmission resource and that is in the DCI is null.

With reference to any one of the first aspect or the first to the fifth possible implementations of the first aspect, in a sixth possible implementation, the data transmission resource includes a frequency-domain transmission resource, and the processing module is specifically configured to:

determine that the frequency-domain transmission resource is the system bandwidth or the available short-TTI data transmission bandwidth, where the available short-TTI data transmission bandwidth is the bandwidth that can be occupied by the short-TTI data transmission resource.

With reference to any one of the first aspect or the first to the fifth possible implementations of the first aspect, in a seventh possible implementation, the data transmission resource includes a frequency-domain transmission resource:

the processing module is further configured to: before determining the data transmission resource, determine a frequency-domain resource scheduling granularity, where the frequency-domain resource scheduling granularity is a minimum frequency-domain resource allocation unit used when the base station schedules the terminal device to perform the data transmission, and includes at least one resource block RB; and the processing module is specifically configured to determine the frequency-domain transmission resource according to the frequency-domain resource scheduling granularity.

With reference to the seventh possible implementation of the first aspect, in an eighth possible implementation, the processing module is specifically configured to:

determine the frequency-domain resource scheduling granularity according to the system bandwidth, where the frequency-domain resource scheduling granularity satisfies at least one of the following rules:

when the system bandwidth is less than or equal to 10 RBs, the frequency-domain resource scheduling granularity is $N_{RB}$ RBs; when the system bandwidth is 11 to 26 RBs, the frequency-domain resource scheduling granularity is $$N_{RB} \text{ or } \left\lfloor \frac{N_{RB}}{2} \right\rfloor RBs;$$

when the system bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs;$$

where NR is a quantity of RBs included in the system bandwidth.

With reference to the seventh possible implementation of the first aspect, in a ninth possible implementation, the processing module is specifically configured to:

determine the frequency-domain resource scheduling granularity according to the available short-TTI data transmission bandwidth, where the available short-TTI data transmission bandwidth is the bandwidth that can be occupied by the short-TTI data transmission resource, and the frequency-domain resource scheduling granularity satisfies at least one of the following rules:

when the available short-TTI data transmission bandwidth is less than or equal to 10 RBs, the frequency-domain resource scheduling granularity is $N_{RB}$ RBs; when the available short-TTI data transmission bandwidth is 11 to 26 RBs, the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the available short-TTI data transmission bandwidth.

With reference to any one of the seventh to the ninth possible implementations of the first aspect, in a tenth possible implementation, the processing module is specifically configured to:

use a size of the frequency-domain resource scheduling granularity as a size of the frequency-domain transmission resource; and use a reference RB as an starting resource block RB of the frequency-domain transmission resource, where the reference RB is the $m^{th}$ RB following the first RB occupied by the DCI or the $m^{th}$ RB following the last RB occupied by the DCI, and m is an integer greater than or equal to 0.

With reference to the sixth or the tenth possible implementation of the first aspect, in an eleventh possible implementation, an information bit that is used to indicate the frequency-domain transmission resource and that is in the DCI is null.

With reference to any one of the seventh to the ninth possible implementations of the first aspect, in a twelfth possible implementation, the processing module is specifically configured to use a size of the frequency-domain resource scheduling granularity as a size of the frequency-domain transmission resource, where the DCI includes information used to indicate a location of the frequency-domain transmission resource.

With reference to any one of the seventh to the ninth possible implementations of the first aspect, in a thirteenth possible implementation, the processing module is specifically configured to use a reference RB as an starting RB of the frequency-domain transmission resource, where the reference RB is the $m^{th}$ RB following the first RB occupied by the DCI or the $m^{th}$ RB following the last RB occupied by the DCI, and m is an integer greater than or equal to 0; and the DCI includes information used to indicate a size of a bandwidth occupied by the frequency-domain transmission resource.

With reference to any one of the first aspect or the first to the thirteenth possible implementations of the first aspect, in a fourteenth possible implementation, the processing module is further configured to: before determining the data transmission resource, when at least one of the following conditions is satisfied, determine that the data transmission resource used to perform the data transmission with the terminal device is the short-TTI data transmission resource:

a latency requirement of a service currently used by the terminal device is less than a specified latency threshold; or the system bandwidth is greater than a specified bandwidth threshold.

With reference to the fourteenth possible implementation of the first aspect, in a fifteenth possible implementation, the transceiver module is further configured to:

after the processing module determines that the data transmission resource used to perform the data transmission with the terminal device is the short-TTI data transmission resource, and before the processing module determines the data transmission resource, send higher layer signaling or physical layer signaling to the terminal device, to indicate to the terminal device that:

the data transmission resource used to perform the data transmission between the base station and the terminal device is the short-TTI data transmission resource.

With reference to any one of the first aspect or the first to the fifteenth possible implementations of the first aspect, in a sixteenth possible implementation, the processing module is further configured to: before determining the data transmission resource, determine the available short-TTI data transmission resource; and the transceiver module is further configured to: after the processing module determines the available short-TTI data transmission resource, and before the processing module determines the data transmission resource, send, to the terminal device, information indicating the available short-TTI data transmission resource.

According to a second aspect, an embodiment of the present invention provides a terminal device, including:

a transceiver module, configured to receive DCI sent by a base station, where the DCI is used to indicate a data transmission resource; and a processing module, configured to determine the data transmission resource according to the DCI, where the data transmission resource is a short-TTI data transmission resource, and the short-TTI data transmission resource is less than a length of one subframe or is less than 1 ms in time domain, where the transceiver module is further configured to perform data transmission with the base station on the data transmission resource.

With reference to the second aspect, in a first possible implementation, the data transmission resource includes a time-domain transmission resource, and the processing module is specifically configured to:

determine a time-domain pattern, and determine, according to the DCI and in multiple time-domain elements included in the determined time-domain pattern, one time-domain element as the time-domain transmission resource; or determine, according to the DCI, an starting symbol and a quantity of symbols of the time-domain transmission resource.

With reference to the first possible implementation of the second aspect, in a second possible implementation, the processing module is specifically configured to:

if the data transmission is downlink data transmission, determine that a time-domain element occupied by the DCI is the time-domain transmission resource; or if the data transmission is uplink data transmission, determine that a time-domain element in which the $k^{th}$ symbol following the first symbol occupied by the DCI or the $k^{th}$ symbol following the last symbol occupied by the DCI is located is the time-domain transmission resource.

With reference to the first or the second possible implementation of the second aspect, in a third possible implementation, the processing module is specifically configured to:

determine the time-domain pattern according to a system bandwidth, where a higher system bandwidth indicates a smaller quantity of symbols included in the time-domain element included in the determined time-domain pattern; or determine the time-domain pattern according to an available short-TTI data transmission bandwidth, where a higher available short-TTI data transmission bandwidth indicates a smaller quantity of symbols included in the time-domain element included in the determined time-domain pattern, and the available short-TTI data transmission bandwidth is a bandwidth that can be occupied by the short-TTI data transmission resource.

With reference to any one of the first to the third possible implementations of the second aspect, in a fourth possible implementation, in the time-domain pattern:

each subframe includes two time-domain elements, a first time-domain element is located in the first slot, a second time-domain element is located in the second slot, and the time-domain elements do not include a symbol occupied by a legacy PDCCH; or each subframe includes four time-domain elements; for a normal cyclic prefix CP, a first time-domain element includes a set of symbols whose sequence numbers are {#0, #1, #2, #3}, a second time-domain element includes a set of symbols whose sequence numbers are {#4, #5, #6}, a third time-domain element includes a set of symbols whose sequence numbers are {#7, #8, #9, #10}, and a fourth time-domain element includes a set of symbols whose sequence numbers are {#11, #12, #13}; for an extended CP, every three consecutive symbols form one time-domain element, a first time-domain element includes a set of symbols whose sequence numbers are {#0, #1, #2}, a second time-domain element includes a set of symbols whose sequence numbers are {#3, #4, #5}, a third time-domain element includes a set of symbols whose sequence numbers are {#6, #7, #8}, and a fourth time-domain element includes a set of symbols whose sequence numbers are {#9, #10, #11}; and the time-domain elements do not include a symbol occupied for transmitting a PDCCH; or for a normal CP, each subframe includes seven time-domain elements, and every two consecutive symbols form one time-domain element; for an extended CP, each subframe includes six time-domain elements, and every two consecutive symbols form one time-domain element; and the time-domain elements do not include a symbol occupied by a legacy PDCCH.

With reference to the first possible implementation of the second aspect, in a fifth possible implementation, the processing module is specifically configured to:

determine that the starting symbol of the time-domain transmission resource is a reference symbol, where the reference symbol is the first symbol occupied by the DCI, the last symbol occupied by the DCI, the $k^{th}$ symbol following the first symbol occupied by the DCI, or the $k^{th}$ symbol following the last symbol occupied by the DCI, and k is a positive integer; and determine, according to a system bandwidth, the quantity of symbols of the time-domain transmission resource, where a higher system bandwidth indicates a smaller quantity of occupied symbols; or determine, by the terminal device according to an available short-TTI data transmission bandwidth, the quantity of symbols of the time-domain transmission resource, where a higher available short-TTI data transmission bandwidth indicates a smaller quantity of occupied symbols, and the available short-TTI data transmission bandwidth is a bandwidth that can be occupied by the short-TTI data transmission resource.

With reference to any one of the first to the fifth possible implementations of the second aspect, in a sixth possible implementation, an information bit that is used to indicate the time-domain transmission resource and that is in the DCI is null.

With reference to any one of the second aspect or the first to the sixth possible implementations of the second aspect, in a seventh possible implementation, the data transmission resource includes a frequency-domain transmission resource, and the processing module is specifically configured to:

determine that the frequency-domain transmission resource is the system bandwidth or the available short-TTI data transmission bandwidth, where the available short-TTI data transmission bandwidth is the bandwidth that can be occupied by the short-TTI data transmission resource.

With reference to any one of the second aspect or the first to the sixth possible implementations of the second aspect, in an eighth possible implementation, the data transmission resource includes a frequency-domain transmission resource:

the processing module is further configured to: before determining the data transmission resource, determine a frequency-domain resource scheduling granularity, where the frequency-domain resource scheduling granularity is a minimum frequency-domain resource allocation unit used when the base station schedules the terminal device to perform the data transmission, and includes at least one resource block RB; and the processing module is specifically configured to determine the frequency-domain transmission resource according to the frequency-domain resource scheduling granularity and the DCI.

With reference to the eighth possible implementation of the second aspect, in a ninth possible implementation, the processing module is specifically configured to:

determine the frequency-domain resource scheduling granularity according to the system bandwidth, where the frequency-domain resource scheduling granularity satisfies at least one of the following rules:

when the system bandwidth is less than or equal to 10 RBs, the frequency-domain resource scheduling granularity is $N_{RB}$ RBs; when the system bandwidth is 11 to 26 RBs, the frequency-domain resource scheduling granularity is $$N_{RB} \text{ or } \left\lfloor \frac{N_{RB}}{2} \right\rfloor RBs;$$

when the system bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the system bandwidth.

With reference to the eighth possible implementation of the second aspect, in a tenth possible implementation, the processing module is specifically configured to determine the frequency-domain resource scheduling granularity according to the available short-TTI data transmission bandwidth, where the available short-TTI data transmission bandwidth is the bandwidth that can be occupied by the short-TTI data transmission resource; and the frequency-domain resource scheduling granularity satisfies at least one of the following rules:

when the available short-TTI data transmission bandwidth is less than or equal to 10 RBs, the frequency-domain resource scheduling granularity is $N_{RB}$ RBs; when the available short-TTI data transmission bandwidth is 11 to 26 RBs, the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the available short-TTI data transmission bandwidth.

With reference to any one of the eighth to the tenth possible implementations of the second aspect, in an eleventh possible implementation, the processing module is specifically configured to:

determine that a size of the frequency-domain transmission resource is the same as a size of the frequency-domain resource scheduling granularity; and determine that an starting resource block RB of the frequency-domain transmission resource is a reference RB, where the reference RB is the $m^{th}$ RB following the first RB occupied by the DCI or the $m^{th}$ RB following the last RB occupied by the DCI, and m is an integer greater than or equal to 0.

With reference to the seventh or the eleventh possible implementation of the second aspect, in a twelfth possible implementation, an information bit that is used to indicate the frequency-domain transmission resource and that is in the DCI is null.

With reference to any one of the eighth to the tenth possible implementations of the second aspect, in a thirteenth possible implementation, the processing module is specifically configured to:

determine that a size of the frequency-domain transmission resource is the same as a size of the frequency-domain resource scheduling granularity; and determine, according to information that is used to indicate a location of the frequency-domain transmission resource and that is included in the DCI, the location of the frequency-domain transmission resource.

With reference to any one of the eighth to the tenth possible implementations of the second aspect, in a fourteenth possible implementation, the processing module is specifically configured to:

determine that an starting RB of the frequency-domain transmission resource is a reference RB, where the reference RB is the $m^{th}$ RB following the first RB occupied by the DCI or the $m^{th}$ RB following the last RB occupied by the DCI, and m is an integer greater than or equal to 0; and determine, according to information that is used to indicate a size of a bandwidth occupied by the frequency-domain transmission resource and that is included in the DCI, the size of the bandwidth occupied by the frequency-domain transmission resource.

With reference to any one of the second aspect or the first to the fourteenth possible implementations of the second aspect, in a fifteenth possible implementation, the transceiver module is further configured to: before the processing module determines the data transmission resource, receive higher layer signaling or physical layer signaling that is sent by the base station, where the signaling indicates to the terminal device that the data transmission resource used to perform the data transmission with the base station is the short-TTI data transmission resource; and the processing module is further configured to determine, according to the higher layer signaling or the physical layer signaling, that the data transmission resource used to perform the data transmission with the base station is the short-TTI data transmission resource.

With reference to any one of the second aspect or the first to the fifteenth possible implementations of the second aspect, in a sixteenth possible implementation, the transceiver module is further configured to: before the processing module determines the data transmission resource, receive information that is about the available short-TTI data transmission resource and that is sent by the base station; and the processing module is further configured to determine the available short-TTI data transmission resource according to the information.

According to a third aspect, an embodiment of the present invention provides a data transmission method, including:

determining, by a base station, a data transmission resource, where the data transmission resource is a short-TTI data transmission resource, and the short-TTI data transmission resource is less than a length of one subframe or is less than 1 ms in time domain:

sending, by the base station, DCI to a terminal device, where the DCI is used to indicate the data transmission resource; and performing, by the base station, data transmission with the terminal device on the data transmission resource.

With reference to the third aspect, in a first possible implementation, the data transmission resource includes a time-domain transmission resource; and the determining, by a base station, the data transmission resource includes:

determining, by the base station, a time-domain pattern, and selecting, from multiple time-domain elements included in the determined time-domain pattern, one time-domain element as the time-domain transmission resource; or determining, by the base station, an starting symbol and a quantity of symbols of the time-domain transmission resource.

With reference to the first possible implementation of the third aspect, in a second possible implementation, the determining, by the base station, the time-domain pattern includes:

determining, by the base station, the time-domain pattern according to a system bandwidth, where a higher system bandwidth indicates a smaller quantity of symbols included in the selected time-domain element included in the time-domain pattern; or determining, by the base station, the time-domain pattern according to an available short-TTI data transmission bandwidth, where a higher available short-TTI data transmission bandwidth indicates a smaller quantity of symbols included in the selected time-domain element included in the time-domain pattern, and the available short-TTI data transmission bandwidth is a bandwidth that can be occupied by the short-TTI data transmission resource.

With reference to the first or the second possible implementation of the third aspect, in a third possible implementation, in the time-domain pattern:

each subframe includes two time-domain elements, a first time-domain element is located in the first slot, a second time-domain element is located in the second slot, and the time-domain elements do not include a symbol occupied by a legacy PDCCH; or each subframe includes four time-domain elements; for a normal cyclic prefix CP, a first time-domain element is a set of symbols whose sequence numbers are {#0, #1, #2, #3}, a second time-domain element includes a set of symbols whose sequence numbers are {#4, #5, #6}, a third time-domain element is a set of symbols whose sequence numbers are {#7, #8. #9, #10}, and a fourth time-domain element is a set of symbols whose sequence numbers are {#11, #12, #13}; for an extended CP, every three consecutive symbols form one time-domain element, a first time-domain element is a set of symbols whose sequence numbers are {#0. #1, #2}, a second time-domain element is a set of symbols whose sequence numbers are {#3, #4, #5}, a third time-domain element is a set of symbols whose sequence numbers are {#6. #7, #8}, and a fourth time-domain element is a set of symbols whose sequence numbers are {#9, #10, #11}; and the time-domain elements do not include a symbol occupied for transmitting a PDCCH; or for a normal CP, each subframe includes seven time-domain elements, and every two consecutive symbols form one time-domain element; for an extended CP, each subframe includes six time-domain elements, and every two consecutive symbols form one time-domain element; and the time-domain elements do not include a symbol occupied by a legacy PDCCH.

With reference to the first possible implementation of the third aspect, in a fourth possible implementation, the determining, by the base station, an starting symbol and a quantity of symbols of the time-domain transmission resource includes:

using, by the base station, a reference symbol as the starting symbol of the time-domain transmission resource, where the reference symbol is the first symbol occupied by the DCI, the last symbol occupied by the DCI, the $k^{th}$ symbol following the first symbol occupied by the DCI, or the $k^{th}$ symbol following the last symbol occupied by the DCI, and k is a positive integer; and determining, by the base station according to a system bandwidth, the quantity of symbols of the time-domain transmission resource, where a higher system bandwidth indicates a smaller quantity of occupied symbols, or determining, by the base station according to an available short-TTI data transmission bandwidth, the quantity of symbols of the time-domain transmission resource, where a higher available short-TTI data transmission bandwidth indicates a smaller quantity of occupied symbols, and the available short-TTI data transmission bandwidth is a bandwidth that can be occupied by the short-TTI data transmission resource.

With reference to any one of the first to the fourth possible implementations of the third aspect, in a fifth possible implementation, an information bit that is used to indicate the time-domain transmission resource and that is in the DCI is null.

With reference to any one of the third aspect or the first to the fifth possible implementations of the third aspect, in a sixth possible implementation, the data transmission resource includes a frequency-domain transmission resource; and the determining, by a base station, the data transmission resource includes:

determining, by the base station, that the frequency-domain transmission resource is the system bandwidth or the available short-TTI data transmission bandwidth, where the available short-TTI data transmission bandwidth is the bandwidth that can be occupied by the short-TTI data transmission resource.

With reference to any one of the third aspect or the first to the fifth possible implementations of the third aspect, in a seventh possible implementation, the data transmission resource includes a frequency-domain transmission resource:

before the determining, by a base station, the data transmission resource, the method further includes:

determining, by the base station, a frequency-domain resource scheduling granularity, where the frequency-domain resource scheduling granularity is a minimum frequency-domain resource allocation unit used when the base station schedules the terminal device to perform the data transmission, and includes at least one resource block RB; and the determining, by a base station, the data transmission resource includes:

determining, by the base station, the frequency-domain transmission resource according to the frequency-domain resource scheduling granularity.

With reference to the seventh possible implementation of the third aspect, in an eighth possible implementation, the determining, by the base station, the frequency-domain resource scheduling granularity includes:

determining, by the base station, the frequency-domain resource scheduling granularity according to the system bandwidth, where the frequency-domain resource scheduling granularity satisfies at least one of the following rules:

when the system bandwidth is less than or equal to 10 RBs, the frequency-domain resource scheduling granularity is $N_{RB}$ RBs; when the system bandwidth is 11 to 26 RBs, the frequency-domain resource scheduling granularity is $$N_{RB} \text{ or } \left\lfloor \frac{N_{RB}}{2} \right\rfloor RBs;$$

when the system bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the system bandwidth.

With reference to the seventh possible implementation of the third aspect, in a ninth possible implementation, the determining, by the base station, a frequency-domain resource scheduling granularity includes:

determining, by the base station, the frequency-domain resource scheduling granularity according to the available short-TTI data transmission bandwidth, where the available short-TTI data transmission bandwidth is the bandwidth that can be occupied by the short-TTI data transmission resource, where the frequency-domain resource scheduling granularity satisfies at least one of the following rules:

when the available short-TTI data transmission bandwidth is less than or equal to 10 RBs, the frequency-domain resource scheduling granularity is $N_{RB}$ RBs; when the available short-TTI data transmission bandwidth is 11 to 26 RBs, the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the available short-TTI data transmission bandwidth.

With reference to any one of the seventh to the ninth possible implementations of the third aspect, in a tenth possible implementation, the determining, by the base station, the frequency-domain transmission resource according to the frequency-domain resource scheduling granularity includes: using, by the base station, a size of the frequency-domain resource scheduling granularity as a size of the frequency-domain transmission resource; and using, by the base station, a reference RB as an starting resource block RB of the frequency-domain transmission resource, where the reference RB is the $m^{th}$ RB following the first RB occupied by the DCI or the $m^{th}$ RB following the last RB occupied by the DCI, and m is an integer greater than or equal to 0.

With reference to the sixth or the tenth possible implementation of the third aspect, in an eleventh possible implementation, an information bit that is used to indicate the frequency-domain transmission resource and that is in the DCI is null.

With reference to any one of the seventh to the ninth possible implementations of the third aspect, in a twelfth possible implementation, the determining, by the base station, the frequency-domain transmission resource according to the frequency-domain resource scheduling granularity includes: using, by the base station, a size of the frequency-domain resource scheduling granularity as a size of the frequency-domain transmission resource, where the DCI includes information used to indicate a location of the frequency-domain transmission resource.

With reference to any one of the seventh to the ninth possible implementations of the third aspect, in a thirteenth possible implementation, the determining, by the base station, the frequency-domain transmission resource according to the frequency-domain resource scheduling granularity includes:

using, by the base station, a reference RB as an starting RB of the frequency-domain transmission resource, where the reference RB is the $m^{th}$ RB following the first RB occupied by the DCI or the $m^{th}$ RB following the last RB occupied by the DCI, and m is an integer greater than or equal to 0; and the DCI includes information used to indicate a size of a bandwidth occupied by the frequency-domain transmission resource.

With reference to any one of the third aspect or the first to the thirteenth possible implementations of the third aspect, in a fourteenth possible implementation, before the determining, by a base station, the data transmission resource, the method further includes:

when at least one of the following conditions is satisfied, determining, by the base station, that the data transmission resource used to perform the data transmission with the terminal device is the short-TTI data transmission resource:

a latency requirement of a service currently used by the terminal device is less than a specified latency threshold; or the system bandwidth is greater than a specified bandwidth threshold.

With reference to the fourteenth possible implementation of the third aspect, in a fifteenth possible implementation, after the determining, by the base station, that the data transmission resource used to perform the data transmission with the terminal device is the short-TTI data transmission resource, and before the determining the data transmission resource, the method further includes:

sending, by the base station, higher layer signaling or physical layer signaling to the terminal device, to indicate to the terminal device that the data transmission resource used to perform the data transmission between the base station and the terminal device is the short-TTI data transmission resource.

With reference to any one of the third aspect or the first to the fifteenth possible implementations of the third aspect, in a sixteenth possible implementation, before the determining, by a base station, the data transmission resource, the method further includes:

determining, by the base station, the available short-TTI data transmission resource; and sending, by the base station to the terminal device, information indicating the available short-TTI data transmission resource.

According to a fourth aspect, an embodiment of the present invention provides a data transmission method, including:

receiving, by a terminal device, DCI sent by a base station, where the DCI is used to indicate a data transmission resource;

determining, by the terminal device, the data transmission resource according to the DCI, where the data transmission resource is a short-TTI data transmission resource, and the short-TTI data transmission resource is less than a length of one subframe or is less than 1 ms in time domain; and performing, by the terminal device, data transmission with the base station on the data transmission resource.

With reference to the fourth aspect, in a first possible implementation, the data transmission resource includes a time-domain transmission resource; and the determining, by the terminal device, the data transmission resource according to the DCI includes:

determining, by the terminal device, a time-domain pattern, and determining, according to the DCI and in multiple time-domain elements included in the determined time-domain pattern, one time-domain element as the time-domain transmission resource; or determining, by the terminal device according to the DCI, an starting symbol and a quantity of symbols of the time-domain transmission resource.

With reference to the first possible implementation of the fourth aspect, in a second possible implementation, the determining, by the terminal device according to the DCI and in multiple time-domain elements included in the determined time-domain pattern, one time-domain element as the time-domain transmission resource includes:

if the data transmission is downlink data transmission, determining, by the terminal device, that a time-domain element occupied by the DCI is the time-domain transmission resource; or if the data transmission is uplink data transmission, determining, by the terminal device, that a time-domain element in which the $k^{th}$ symbol following the first symbol occupied by the DCI or the $k^{th}$ symbol following the last symbol occupied by the DCI is located is the time-domain transmission resource.

With reference to the first or the second possible implementation of the fourth aspect, in a third possible implementation, the determining, by the terminal device, the time-domain pattern includes:

determining, by the terminal device, the time-domain pattern according to a system bandwidth, where a higher system bandwidth indicates a smaller quantity of symbols included in the time-domain element included in the determined time-domain pattern; or determining, by the terminal device, the time-domain pattern according to an available short-TTI data transmission bandwidth, where a higher available short-TTI data transmission bandwidth indicates a smaller quantity of symbols included in the time-domain element included in the determined time-domain pattern, and the available short-TTI data transmission bandwidth is a bandwidth that can be occupied by the short-TTI data transmission resource.

With reference to any one of the first to the third possible implementations of the fourth aspect, in a fourth possible implementation, in the time-domain pattern:

each subframe includes two time-domain elements, a first time-domain element is located in the first slot, a second time-domain element is located in the second slot, and the time-domain elements do not include a symbol occupied by a legacy PDCCH; or each subframe includes four time-domain elements; for a normal cyclic prefix CP, a first time-domain element includes a set of symbols whose sequence numbers are {#0, #1. #2, #3}, a second time-domain element includes a set of symbols whose sequence numbers are {#4. #5, #6}, a third time-domain element includes a set of symbols whose sequence numbers are {#7, #8, #9, #10}, and a fourth time-domain element includes a set of symbols whose sequence numbers are {#11, #12, #13}; for an extended CP, every three consecutive symbols form one time-domain element, a first time-domain element includes a set of symbols whose sequence numbers are {#0, #1, #2}, a second time-domain element includes a set of symbols whose sequence numbers are {#3, #4, #5}, a third time-domain element includes a set of symbols whose sequence numbers are {#6, #7, #8}, and a fourth time-domain element includes a set of symbols whose sequence numbers are {#9, #10, #11}; and the time-domain elements do not include a symbol occupied for transmitting a PDCCH; or for a normal CP, each subframe includes seven time-domain elements, and every two consecutive symbols form one time-domain element; for an extended CP, each subframe includes six time-domain elements, and every two consecutive symbols form one time-domain element; and the time-domain elements do not include a symbol occupied by a legacy PDCCH.

With reference to the first possible implementation of the fourth aspect, in a fifth possible implementation, the determining, by the terminal device according to the DCI, an starting symbol and a quantity of symbols of the time-domain transmission resource includes:

determining, by the terminal device, that the starting symbol of the time-domain transmission resource is a reference symbol, where the reference symbol is the first symbol occupied by the DCI, the last symbol occupied by the DCI, the $k^{th}$ symbol following the first symbol occupied by the DCI, or the $k^{th}$ symbol following the last symbol occupied by the DCI, and k is a positive integer; and determining, by the terminal device according to a system bandwidth, the quantity of symbols of the time-domain transmission resource, where a higher system bandwidth indicates a smaller quantity of occupied symbols; or determining, by the terminal device according to an available short-TTI data transmission bandwidth, the quantity of symbols of the time-domain transmission resource, where a higher available short-TTI data transmission bandwidth indicates a smaller quantity of occupied symbols, and the available short-TTI data transmission bandwidth is a bandwidth that can be occupied by the short-TTI data transmission resource.

With reference to any one of the first to the fifth possible implementations of the fourth aspect, in a sixth possible implementation, an information bit that is used to indicate the time-domain transmission resource and that is in the DCI is null.

With reference to any one of the fourth aspect or the first to the sixth possible implementations of the fourth aspect, in a seventh possible implementation, the data transmission resource includes a frequency-domain transmission resource; and the determining, by the terminal device, the data transmission resource includes:

determining, by the terminal device, that the frequency-domain transmission resource is the system bandwidth or the available short-TTI data transmission bandwidth, where the available short-TTI data transmission bandwidth is the bandwidth that can be occupied by the short-TTI data transmission resource.

With reference to any one of the fourth aspect or the first to the sixth possible implementations of the fourth aspect, in an eighth possible implementation, the data transmission resource includes a frequency-domain transmission resource;

before the determining, by the terminal device, the data transmission resource, the method further includes:

determining, by the terminal device, a frequency-domain resource scheduling granularity, where the frequency-domain resource scheduling granularity is a minimum frequency-domain resource allocation unit used when the base station schedules the terminal device to perform the data transmission, and includes at least one resource block RB; and the determining, by the terminal device, the data transmission resource includes:

determining, by the terminal device, the frequency-domain transmission resource according to the frequency-domain resource scheduling granularity and the DCI.

With reference to the eighth possible implementation of the fourth aspect, in a ninth possible implementation, the determining, by the terminal device, the frequency-domain resource scheduling granularity includes:

determining, by the terminal device, the frequency-domain resource scheduling granularity according to the system bandwidth, where the frequency-domain resource scheduling granularity satisfies at least one of the following rules:

when the system bandwidth is less than or equal to 10 RBs, the frequency-domain resource scheduling granularity is $N_{RB}$ RBs; when the system bandwidth is 11 to 26 RBs, the frequency-domain resource scheduling granularity is $$N_{RB} \text{ or } \left\lfloor \frac{N_{RB}}{2} \right\rfloor RBs;$$

when the system bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the system bandwidth.

With reference to the eighth possible implementation of the fourth aspect, in a tenth possible implementation, the determining, by the terminal device, the frequency-domain resource scheduling granularity includes:

determining, by the terminal device, the frequency-domain resource scheduling granularity according to the available short-TTI data transmission bandwidth, where the available short-TTI data transmission bandwidth is the bandwidth that can be occupied by the short-TTI data transmission resource; and the frequency-domain resource scheduling granularity satisfies at least one of the following rules:

when the available short-TTI data transmission bandwidth is less than or equal to 10 RBs, the frequency-domain resource scheduling granularity is $N_{RB}$ RBs; when the available short-TTI data transmission bandwidth is 11 to 26 RBs, the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the frequency-domain resource scheduling granularity is or $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where is a quantity of RBs included in the available short-TTI data transmission bandwidth.

With reference to any one of the eighth to the tenth possible implementations of the fourth aspect, in an eleventh possible implementation, the determining, by the terminal device, the frequency-domain transmission resource according to the frequency-domain resource scheduling granularity and the DCI includes:

determining, by the terminal device, that a size of the frequency-domain transmission resource is the same as a size of the frequency-domain resource scheduling granularity; and determining, by the terminal device, that an starting resource block RB of the frequency-domain transmission resource is a reference RB, where the reference RB is the $m^{th}$ RB following the first RB occupied by the DCI or the $m^{th}$ RB following the last RB occupied by the DCI, and m is an integer greater than or equal to 0.

With reference to the seventh or the eleventh possible implementation of the fourth aspect, in a twelfth possible implementation, an information bit that is used to indicate the frequency-domain transmission resource and that is in the DCI is null.

With reference to any one of the eighth to the tenth possible implementations of the fourth aspect, in a thirteenth possible implementation, the determining, by the terminal device, the frequency-domain transmission resource according to the frequency-domain resource scheduling granularity and the DCI includes:

determining, by the terminal device, that a size of the frequency-domain transmission resource is the same as a size of the frequency-domain resource scheduling granularity; and determining, by the terminal device according to information that is used to indicate a location of the frequency-domain transmission resource and that is included in the DCI, the location of the frequency-domain transmission resource.

With reference to any one of the eighth to the tenth possible implementations of the fourth aspect, in a fourteenth possible implementation, the determining, by the terminal device, the frequency-domain transmission resource according to the frequency-domain resource scheduling granularity and the DCI includes:

determining, by the terminal device, that an starting RB of the frequency-domain transmission resource is a reference RB, where the reference RB is the $m^{th}$ RB following the first RB occupied by the DCI or the $m^{th}$ RB following the last RB occupied by the DCI, and m is an integer greater than or equal to 0; and determining, by the terminal device according to information that is used to indicate a size of a bandwidth occupied by the frequency-domain transmission resource and that is included in the DCI, the size of the bandwidth occupied by the frequency-domain transmission resource.

With reference to any one of the fourth aspect or the first to the fourteenth possible implementations of the fourth aspect, in a fifteenth possible implementation.

before the determining, by the terminal device, the data transmission resource, the method further includes:

receiving, by the terminal device, higher layer signaling or physical layer signaling that is sent by the base station, where the signaling indicates to the terminal device that the data transmission resource used to perform the data transmission with the base station is the short-TTI data transmission resource; and determining, by the terminal device according to the higher layer signaling or the physical layer signaling, that the data transmission resource used to perform the data transmission with the base station is the short-TTI data transmission resource.

With reference to any one of the fourth aspect or the first to the fifteenth possible implementations of the fourth aspect, in a sixteenth possible implementation, before the determining, by the terminal device, the data transmission resource, the method further includes:

receiving, by the terminal device, information that is about the available short-TTI data transmission resource and that is sent by the base station, and determining the available short-TTI data transmission resource according to the information.

According to a fifth aspect, an embodiment of the present invention provides a wireless communications system, including a base station and a terminal device, where the base station is configured to: determine a data transmission resource, where the data transmission resource is a short-TTI data transmission resource, and the short-TTI data transmission resource is less than a length of one subframe or is less than 1 ms in time domain; send DCI to the terminal device, where the DCI is used to indicate the data transmission resource; and perform data transmission with the terminal device on the data transmission resource; and the terminal device is configured to: receive the DCI sent by the base station; determine the data transmission resource according to the DCI; and perform the data transmission with the base station on the data transmission resource.

In the embodiments of the present invention, because the data transmission resource is the short-TTI data transmission resource, a transmission time interval is shortened, a quantity of times of scheduling per unit time can be increased for one terminal device, and a data transmission latency can be effectively reduced.

DESCRIPTION OF EMBODIMENTS

Figure 1:
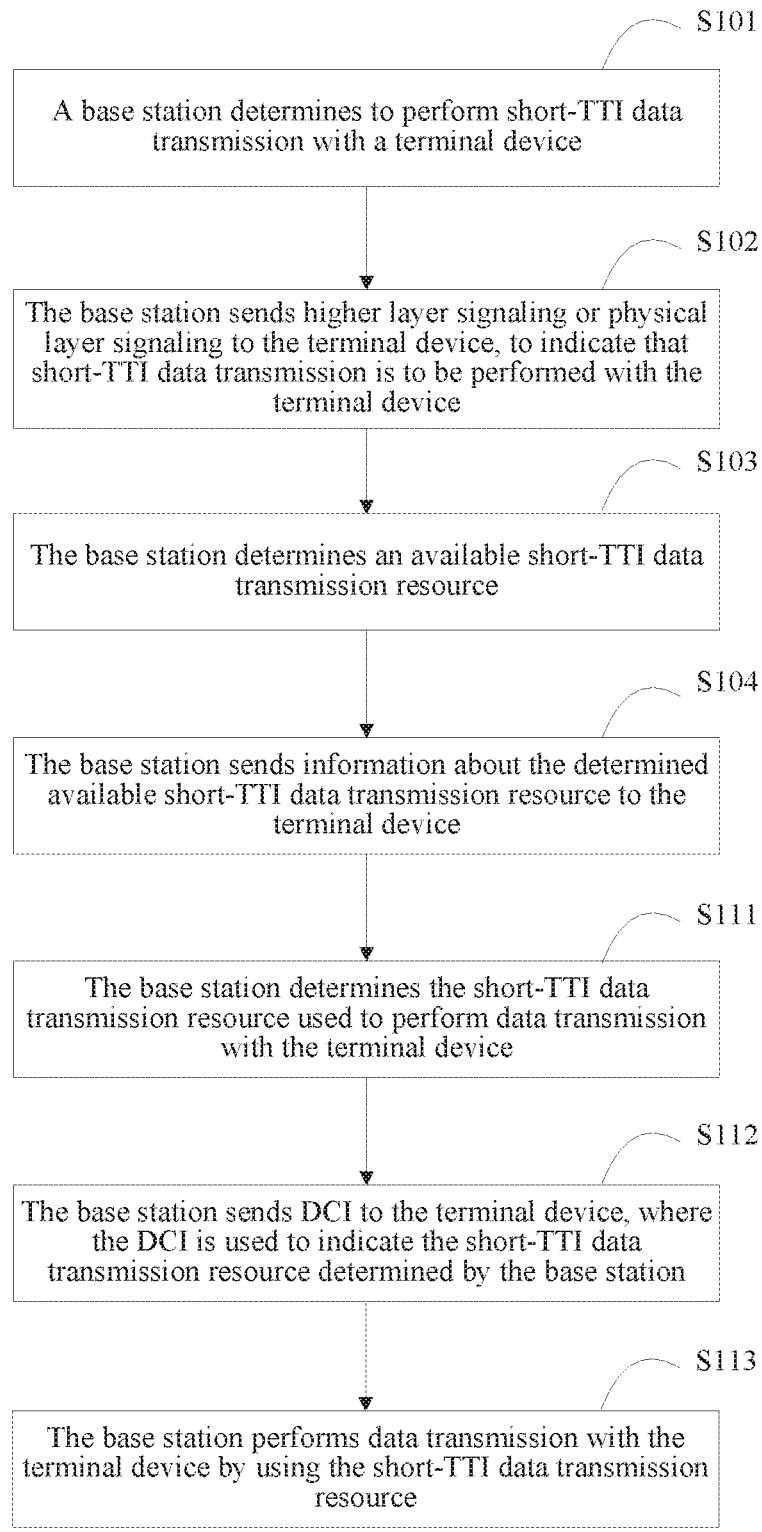
FIG. 1 is a flowchart of a data transmission method according to Embodiment 1 of the present invention.

Embodiments of the present invention provide a data transmission method, an apparatus, and a system, to resolve a problem that a transmission mechanism based on a TTI of one subframe or a transmission mechanism based on a TTI of 1 ms cannot satisfy a service latency requirement of a user.

In the embodiments of the present invention, a base station determines a data transmission resource used to perform data transmission with a terminal device, where the data transmission resource is a short-TTI data transmission resource, and the short-TTI data transmission resource is less than a length of one subframe or is less than 1 ms in time domain; the base station sends DCI to the terminal device, where the DCI is used to indicate the data transmission resource; and the terminal device receives the DCI sent by the base station, and determines, according to the DCI, the data transmission resource used to perform the data transmission with the base station.

Because the data transmission resource is the short-TTI data transmission resource, a transmission time interval is shortened, a quantity of times of scheduling per unit time can be increased for one terminal device, and a data transmission latency can be effectively reduced.

For ease of understanding of the embodiments of the present invention, the following first describes basic concepts used in the embodiments of the present invention.

For ease of understanding, an LTE system is used as an example for description but it does not mean that the embodiments of the present invention are applicable only to the LTE system. Actually, the solutions provided in the embodiments of the present invention can be applied to any wireless communications system in which data transmission is performed by means of scheduling, to provide data transmission based on a TTI less than one subframe or less than 1 ms.

1. Data Transmission and Scheduling

In the LTE system, downlink data is transmitted on a physical downlink shared channel (PDSCH), and uplink data is transmitted on a physical uplink shared channel (PUSCH).

Before receiving downlink data or sending uplink data, a terminal device UE in the LTE system needs to know scheduling information configured by the base station for the UE, for example, time-frequency resource allocation or a modulation and coding scheme. In addition, the base station further needs to notify the UE of information about a power control command related to uplink transmission. The scheduling information and the information about the power control command belong to downlink control information (DCI). The DCI is carried on a physical downlink control channel (PDCCH).

The PDCCH used in the embodiments of the present invention may be a PDCCH defined in release (Rel)-8, an enhanced physical downlink control channel (ePDCCH) defined in Rel-11, and/or an evolved PDCCH in the future, provided that the PDCCH can be used to send the DCI to the terminal device.

2. Frame Structure

Usually, a radio frame is used to identify a time in a wireless communications system. For example, in the LTE system, each radio frame includes 10 subframes with a length of 1 ms each, and each subframe includes two slots.

For a normal cyclic prefix (normal CP), each slot includes seven symbols. For an extended CP, each slot includes six symbols. In other words, for the normal CP, each subframe includes 14 symbols. That is, each subframe includes symbols whose sequence numbers are {#0, #1, #2, #3, #4, #5, #6, #7, #8, #9, #10, #11, #12, #13}. For the extended CP, each subframe includes 12 symbols. That is, each subframe includes symbols whose sequence numbers are {#0. #1, #2, #3, #4, #5, #6, #7, #8. #9, #10, #11}.

An uplink symbol is referred to as a single carrier-frequency division multiple access (SC-FDMA) symbol, and a downlink symbol is referred to as an orthogonal frequency division multiplexing (OFDM) symbol. It should be noted that an uplink symbol may also be referred to as an OFDM symbol if an uplink multiple access manner of orthogonal frequency division multiple access (OFDMA) is used in a subsequent technology. In the embodiments of the present invention, both the uplink symbol and the downlink symbol are briefly referred to as a symbol.

3. Frequency-Domain Resource Scheduling Granularity

The frequency-domain resource scheduling granularity is a minimum frequency-domain resource allocation unit used when the base station schedules the terminal device to perform data transmission.

For example, the frequency-domain resource scheduling granularity may be several resource blocks (RB), for example, 25 RBs, 20 RBs, 10 RBs, or 5 RBs.

In some embodiments of the present invention, a data transmission resource includes several frequency-domain resource scheduling granularities in a frequency domain.

For example, if the data transmission resource occupies 10 RBs in the frequency domain, and a resource scheduling granularity in the frequency domain, that is, the frequency-domain resource scheduling granularity, is two RBs, the data transmission resource includes five frequency-domain resource scheduling granularities in the frequency domain.

For another example, a system bandwidth is 10 RBs, and the frequency-domain resource scheduling granularity is four RBs. If the base station allocates the entire system bandwidth to the terminal device, the last two RBs are also allocated to the terminal device.

4. Short-TTI Data Transmission

In the embodiments of the present invention, a data transmission resource with a TTI less than one subframe or 1 ms is referred to as a "short-TTI data transmission resource". For example, when a subframe length is 1 ms, a transmission resource with a TTI less than 1 ms is referred to as a "short-TTI data transmission resource". For example, the TTI is 0.5 ms.

Similarly, a data packet with a TTI less than one subframe or 1 ms is referred to as a "short-TTI data packet". For example, when a subframe length is 1 ms, a data packet with a TTI less than 1 ms is referred to as a "short-TTI data packet". For example, the TTI is 0.5 ms.

Similarly, data transmission with a TTI less than one subframe or 1 ms is referred to as "short-TTI data transmission". For example, when a subframe length is 1 ms, data transmission with a TTI less than 1 ms is referred to as "short-TTI data transmission". For example, the TTI has a length of two symbols.

For short-TTI data transmission, a transmission resource allocated during one scheduling is less than a length of one subframe in the time domain.

5. Resource Allocation (RA) Information

In the LTE system, the DCI includes the resource allocation RA information. For uplink data transmission, there are currently two RA manners. For downlink data transmission, there are currently three RA manners. Different RA manners are corresponding to different quantities of bits of RA information.

Currently, in the LTE system, a TTI is 1 ms, and the base station only needs to send one piece of DCI within 1 ms to instruct the UE to receive or send a data packet (Packet data) with a TTI of 1 ms. In the embodiments of the present invention, because short-TTI data transmission is used, for example, a TTI is shortened to a length between a length of one symbol and 0.5 ms, the base station may need to send multiple pieces of DCI within 1 ms to instruct the UE to receive or send multiple short-TTI data packets.

Because DCI is carried on a PDCCH, after the short-TTI data packet is introduced, more DCI needs to be transmitted per unit time, and a quantity of bits of RA information that need to be transmitted per unit time also increases correspondingly, leading to relatively large overheads of the RA information.

6. Control Channel Element (CCE) Aggregation Level

In the LTE system, a downlink control channel PDCCH used to send scheduling information is formed by L CCEs by means of aggregation, and L is a positive integer and is referred to as an aggregation level. For example, for a PDCCH defined in Rel-8, L may be 1, 2, 4, or 8. For another example, for an ePDCCH defined in Rel-11, L may be 1, 2, 4, 8, 16, or 32.

7. Wireless Communications Standards, Base Stations, and Terminal Devices to which the Embodiments of the Present Invention are Applicable A wireless communications standard to which the embodiments of the present invention are applicable includes but is not limited to the following standards:

Global System for Mobile Communications (GSM), code division multiple access (CDMA) IS-95, code division multiple access (CDMA) 2000, time division-synchronous code division multiple access (TD-SCDMA), wideband code division multiple access (WCDMA), time division duplexing-Long Term Evolution (TDD-LTE), frequency division duplexing-Long Term Evolution (FDD LTE), Long Term Evolution-Advanced (LTE-advanced), a personal handyphone system (PHS), Wireless Fidelity (Wi-Fi) stipulated in 802.11 series protocols, worldwide interoperability for microwave access (WiMAX), and a short range wireless communications system such as Bluetooth.

The terminal device may be user equipment, including but not limited to: a mobile phone, a tablet computer, a personal digital assistant (PDA), a point of sales (POS), or an in-vehicle computer.

The base station provides a wireless interface for the terminal device, and the wireless interface may also be referred to as an air interface. The terminal device accesses the wireless communications system on the base station. In addition, the base station may further include a control device configured to manage the base station.

For example, for an LTE system such as a TDD LTE system, an FDD LTE system, or an LTE-A system, the base station may be an evolved NodeB (eNodeB), and the terminal device may be UE. For a TD-SCDMA system or a WCDMA system, the base station may include a NodeB, or include a NodeB and a radio network controller (RNC), and the terminal device may be UE. For a GSM system, the base station may include a base transceiver station (BTS), or include a BTS and a base station controller (BSC), and the terminal device is a mobile station (MS). For a Wi-Fi system, the base station may include an access point (AP) and/or an access controller (AC), and the terminal device may be a station (STA).

The following describes in detail the embodiments of the present invention with reference to the accompanying drawings. First, the data transmission method provided in the embodiments of the present invention is described. Then, the base station and the terminal device that are provided in the embodiments of the present invention are described. Finally, the wireless communications system provided in the embodiments of the present invention is described.

For clear descriptions, the following table lists the embodiments of the present invention and the corresponding accompanying drawings.

Figure 2:
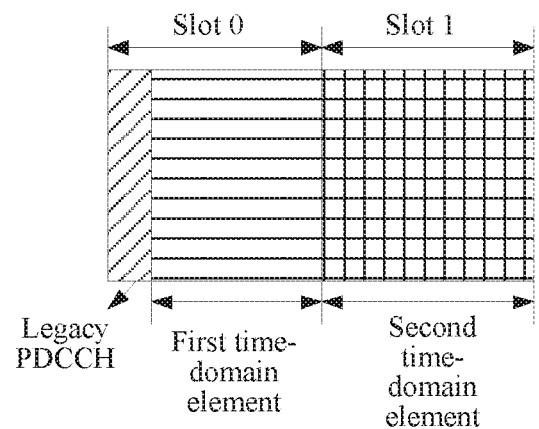
FIG. 2 is a schematic diagram of a pattern 1 in a time-domain pattern.
Figure 3:
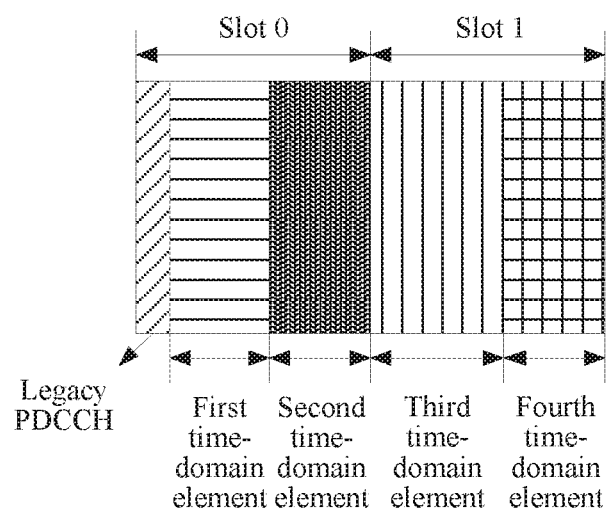
FIG. 3 is a schematic diagram of a pattern 2 in a time-domain pattern.
Figure 4:
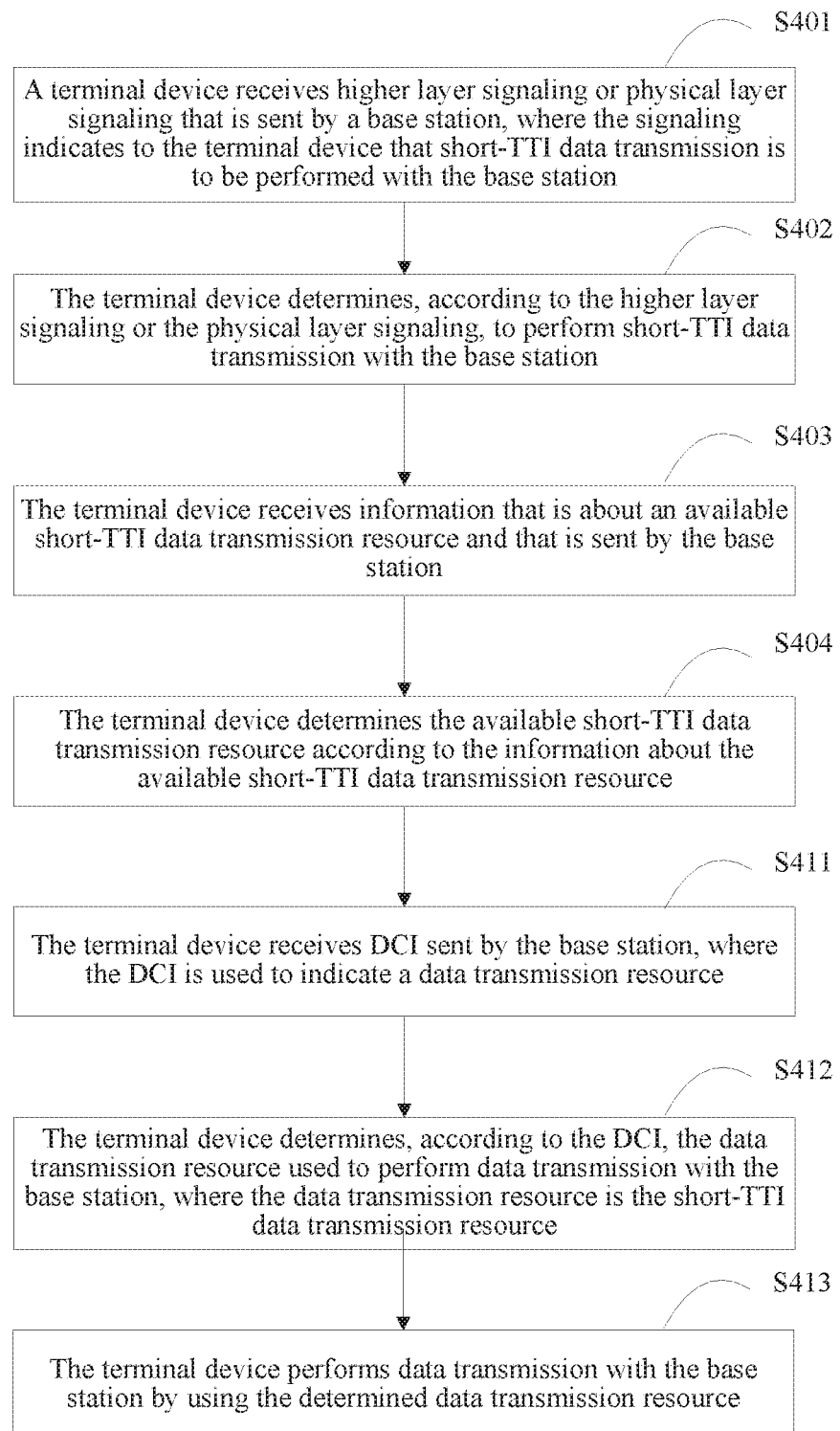
FIG. 4 is a flowchart of a data transmission method according to Embodiment 2 of the present invention.
Figure 5:
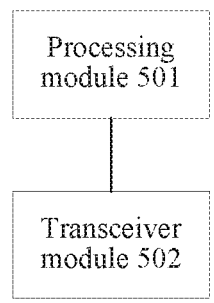
FIG. 5 is a schematic structural diagram of a base station according to Embodiment 3 of the present invention.
Figure 6:
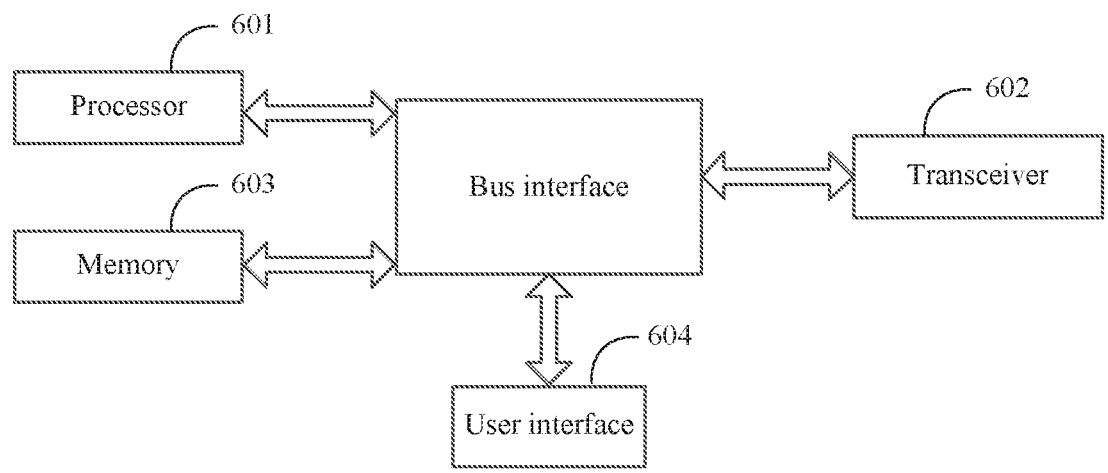
FIG. 6 is a schematic structural diagram of a base station in an optional implementation according to Embodiment 3 of the present invention.
Figure 7:
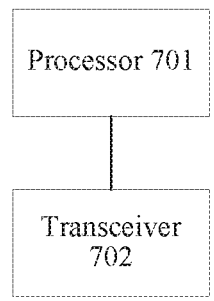
FIG. 7 is a schematic structural diagram of a base station in another optional implementation according to Embodiment 3 of the present invention.
Figure 8:
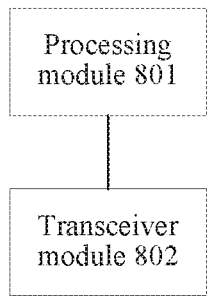
FIG. 8 is a schematic structural diagram of a terminal device according to Embodiment 4 of the present invention.
Figure 9:
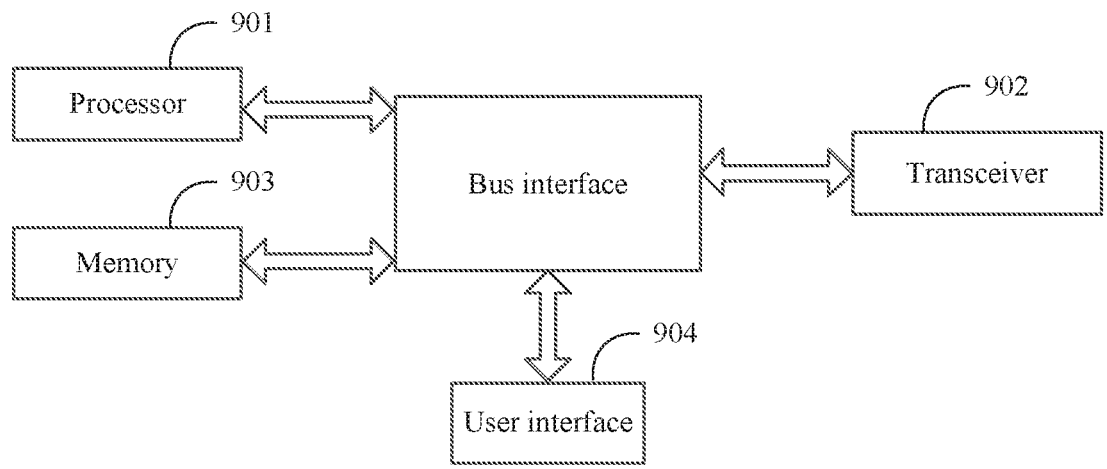
FIG. 9 is a schematic structural diagram of a terminal device in an optional implementation according to Embodiment 4 of the present invention.
Figure 10:
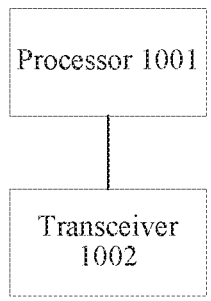
FIG. 10 is a schematic structural diagram of a terminal device in another possible implementation according to Embodiment 4 of the present invention.
Figure 11:
FIG. 11 is a schematic structural diagram of a wireless communications system according to Embodiment 5 of the present invention.

| Embodiment | Content | Accompanying drawing |
|---|---|---|
| Embodiment 1 | Data transmission method (used on a base station side) | FIG. 1 to FIG. 3 |
| Embodiment 2 | Data transmission method (used on a terminal device side) | FIG. 4 |
| Embodiment 3 | Base station | FIG. 5 to FIG. 7 |
| Embodiment 4 | Terminal device | FIG. 8 to FIG. 10 |
| Embodiment 5 | Wireless communications system | FIG. 11 |

Embodiment 1

FIG. 1 is a flowchart of a data transmission method according to Embodiment 1. As shown in FIG. 1, the method includes the following steps.

S111. A base station determines a data transmission resource.

The data transmission resource may be a short-TTI data transmission resource, and the short-TTI data transmission resource is less than a length of one subframe or is less than 1 ms in time domain.

S112. The base station sends DCI to a terminal device, where the DCI is used to indicate the data transmission resource.

S113. The base station performs data transmission with the terminal device on the data transmission resource.

Optionally, before step S111, the method further includes step S101:

when at least one of the following conditions is satisfied, the base station determines that the data transmission resource used to perform the data transmission with the terminal device is the short-TTI data transmission resource, that is, determines to perform short-TTI data transmission with the terminal device:

a latency requirement of a service currently used by the terminal device is less than a specified latency threshold; or a system bandwidth is greater than a specified bandwidth threshold.

Alternatively, step S101 is:

when at least one of the following conditions is satisfied, the base station determines that the data transmission resource used to perform the data transmission with the terminal device is the short-TTI data transmission resource, that is, determines to perform short-TTI data transmission with the terminal device:

a latency requirement of a service currently used by the terminal device is less than a specified latency threshold; or resource utilization is greater than a specified resource utilization threshold.

When the terminal device has a capability of transmitting a short-TTI data packet, that is, supports the short-TTI data transmission, the base station configures a short-TTI data transmission mode for the terminal device according to needs, that is, determines whether to use the short-TTI data transmission resource to perform the data transmission with the terminal device.

For example, the base station may determine, according to the latency requirement of the service currently used by the terminal device, whether to configure the short-TTI data transmission mode for the terminal device. For example, for a small-latency service, the base station may configure the short-TTI data transmission mode for the terminal device, and for a non-small-latency service, the base station configures a data transmission mode with a TTI of 1 ms. It may be determined, according to a service type, whether a service is a small-latency service. For example, a service related to the Internet of Vehicles, a conversational service, or a streaming service is a small-latency service, and a background service or an interactive service is a non-small-latency service.

For another example, the base station may configure the short-TTI data transmission mode for the terminal device according to the system bandwidth. Specifically, the base station may configure a downlink short-TTI data transmission mode or an uplink short-TTI data transmission mode for the terminal device according to a downlink system bandwidth. When the downlink system bandwidth is relatively low, if short-TTI data transmission is performed, overheads of a downlink control channel such as a PDCCH are relatively large, and data transmission is affected. For example, the base station may configure the downlink short-TTI data transmission mode and/or the uplink short-TTI data transmission mode when the downlink system bandwidth is greater than the specified bandwidth threshold, and may not configure the downlink short-TTI data transmission mode or the uplink short-TTI data transmission mode when the downlink system bandwidth is not greater than the specified bandwidth threshold.

Optionally, the base station may also configure the uplink short-TTI data transmission mode for the terminal device according to an uplink system bandwidth. The base station does not configure the uplink short-TTI data transmission mode when the uplink system bandwidth is not greater than the specified bandwidth threshold, and configures the uplink short-TTI data transmission mode when the uplink system bandwidth is greater than the specified bandwidth threshold.

The bandwidth threshold may be 6 RBs, 10 RBs, 25 RBs, 26 RBs, 49 RBs, 50 RBs, or 63 RBs.

For another example, when a quantity of available resource elements (RE) on n downlink symbols is greater than M, the base station may configure short-TTI data transmission. When the quantity of available REs on the n downlink symbols is not greater than M, the base station cannot configure short-TTI data transmission. An available RE is an RE that can be used for short-TTI data transmission.

n is 1, 2, 3, 4, 5, 6, or 7.

$M = L_{MAX} \times M_{CCE}$, or $M = L_{MAX} \times M_{CCE} + M_{ex}$, where $L_{MAX}$ is a maximum aggregation level of a downlink control channel (for example, a PDCCH), $M_{CCE}$ represents that one CCE includes $M_{CCE}$ REs, $M_{ex}$ is a smallest quantity of REs used for short-TTI data transmission, and $M_{ex}$ may be notified to the UE by using higher layer signaling after being predefined or after being configured by the base station.

For example, for a downlink system bandwidth of 20 MHz, 100 RBs may be used for the short-TTI data transmission. In this case, a quantity of available REs on one downlink symbol is 1200 (excluding a cell-specific reference signal (CRS)) or 1000 (including a CRS of one antenna port). Assuming that n=1, $L_{MAX}$=8, $M_{CCE}$=36, and $M_{ex}$=240 (excluding a CRS) or 200 (including a CRS of one antenna port). M=528 or 488. Therefore, the quantity of available REs on one downlink symbol is greater than M, and the base station may configure the short-TTI data transmission.

For another example, for a downlink system bandwidth of 5 MHz, 25 RBs may be used for the short-TTI data transmission. In this case, a quantity of available REs on one downlink symbol is 300 (excluding a cell-specific reference signal (CRS)) or 250 (including a CRS of one antenna port). Assuming that n=1, $L_{MAX}$=8, $M_{CCE}$=36, and $M_{ex}$=240 (excluding a CRS) or 200 (including a CRS of one antenna port), M=528 or 488. Therefore, the quantity of available REs on one downlink symbol is less than M. and the base station cannot configure the short-TTI data transmission.

A resource utilization threshold herein is obtained by dividing M by n.

Optionally, after step S101 of determining, by the base station, to perform the short-TTI data transmission with the terminal device, and before step S111 of determining, by the base station, the data transmission resource, the method further includes step S102:

the base station sends higher layer signaling or physical layer signaling to the terminal device, to indicate to the terminal device that the base station is to perform the short-TTI data transmission with the terminal device.

In step S102, the base station notifies, by using the higher layer signaling or the physical layer signaling, the terminal device that the data transmission between the base station and the terminal device is the short-TTI data transmission. That is, the base station configures the short-TTI data transmission mode for the terminal device.

The higher layer signaling is relative to the physical layer signaling, is signaling from a higher layer and having a lower sending frequency, and includes radio resource control (RRC) signaling and Media Access Control (MAC) signaling. Further, the base station may notify, by using the higher layer signaling or the physical layer signaling, the terminal device that uplink data transmission or downlink data transmission between the base station and the terminal device is the short-TTI data transmission.

When the base station configures an uplink data transmission mode or a downlink data transmission mode by using the higher layer signaling, a specific operation is as follows:

When the base station configures the data transmission mode as the short-TTI data transmission, the base station may send the DCI in the present invention. In addition, during higher layer signaling reconfiguration, there is a ambiguity period in which the base station and the UE do not know data transmission modes of each other. Therefore, optionally, the base station may further send DCI with DCI format 1A or DCI with DCI format 0 in a downlink control area. When the base station sends the DCI with DCI format 1A or the DCI with DCI format 0, the base station schedules a 1 ms downlink data packet or a 1 ms uplink data packet. In this way, during mode switching of a data packet, the base station may send the DCI with DCI format 1A or the DCI with DCI format 0, avoiding behavior inconsistency between the base station and the UE in a ambiguity period. When the data transmission resource is one slot or 0.5 ms in the time domain, and the data transmission resource is located in the first slot or the first 0.5 ms within one subframe, it indicates that DCI of the data transmission may be located in the downlink control area. In this scenario, to reduce a quantity of times of blind detection of the UE on the PDCCH, a quantity of bits of downlink control information may be configured as the same for the DCI and the DCI with DCI format 1A or the DCI with DCI format 0. When the base station configures the data transmission mode as 1 ms data transmission, the base station does not send the DCI in the present invention.

When the base station notifies the terminal device by using the physical layer signaling, the base station sends, in the downlink control area, DCI indicating data transmission with a TTI of 1 ms, for example, DCI with DCI format 0/1/1A/1B/1D/2/2/2A/2B/2C/2D/4, or sends the DCI in this embodiment of the present invention. When the base station sends DCI with DCI format 1/1A/1B/1D/2/2A/2B/2C/2D, the base station schedules a downlink data packet with a TTI of 1 ms. When the base station sends DCI with DCI format 0/4, the base station schedules an uplink data packet with a TTI of 1 ms. When the base station sends the DCI in this embodiment of the present invention, the base station schedules a short-TTI data packet.

Optionally, before step S111 of determining, by the base station, the transmission resource used to perform the data transmission with the terminal device, the method further includes step S103 and step S104.

S103. The base station determines the available short-TTI data transmission resource.

S104. The base station sends information about the determined available short-TTI data transmission resource to the terminal device. For example, the base station sends higher layer signaling or physical layer signaling to the terminal device, and the higher layer signaling or the physical layer signaling indicates the available short-TTI data transmission resource.

An execution sequence between the two steps of step S103 and step S104 and the two steps of step S101 and step S102 is not limited. Step S101 and step S102 may be performed before step S103 and step S104, or step S103 and step S104 may be performed before step S101 and step S102, or the two steps of step S103 and step S104 and the two steps of step S101 and step S102 may be performed at the same time.

Because there are multiple TTI-based data transmission modes in a system, the base station needs to determine the available short-TTI data transmission resource. The available short-TTI data transmission resource may include a frequency-domain bandwidth that can be occupied by the short-TTI data transmission and/or a time-domain resource that can be occupied by the short-TTI data transmission. The frequency-domain bandwidth that can be occupied by the short-TTI data transmission may be briefly referred to as an "available short-TTI data transmission bandwidth". The available short-TTI data transmission bandwidth is a frequency-domain resource that can be occupied by the short-TTI data transmission resource.

For example, if the available short-TTI data transmission resource and another available transmission resource, for example, a data transmission resource with a TTI of 1 ms, are frequency division multiplexed, the information about the available short-TTI data transmission resource includes information used to indicate a frequency-domain bandwidth occupied by the available short-TTI data transmission resource.

For another example, if the available short-TTI data transmission resource and another available transmission resource are time division multiplexed, the information about the available short-TTI data transmission resource includes information used to indicate a time-domain resource occupied by the available short-TTI data transmission resource.

For another example, if the available short-TTI data transmission resource and another available transmission resource are time-frequency division multiplexed, the information about the available short-TTI data transmission resource includes information used to indicate a time-domain resource occupied by the available short-TTI data transmission resource and information used to indicate a frequency-domain bandwidth occupied by the available short-TTI data transmission resource.

Using an example in which the another available transmission resource is the data transmission resource with a TTI of 1 ms, when the data transmission resource with a TTI of 1 ms and the short-TTI data transmission resource are time division multiplexed or time-frequency division multiplexed, the base station configures a first subframe set for the data transmission resource with a TTI of 1 ms. That is, a data packet with a TTI of 1 ms can be transmitted only in a subframe in the first subframe set. Because uplink transmission is a hybrid automatic repeat request (HARQ), a configuration of the first subframe set needs to satisfy an uplink time sequence, and the uplink time sequence includes a time sequence from an uplink grant (UL Grant) to a PUSCH, a time sequence from a PUSCH to an acknowledgement/negative acknowledgement (ACK/NACK) feedback, and a PUSCH retransmission time sequence.

The following further describes step S111 in detail.

In step S111, the data transmission resource includes a time-domain transmission resource and a frequency-domain transmission resource. The time-domain transmission resource is a time-domain resource occupied by the data transmission resource, and the frequency-domain transmission resource is a frequency-domain resource occupied by the data transmission resource. The determining, by a base station, a data transmission resource includes:

determining, by the base station, the time-domain transmission resource; and determining, by the base station, the frequency-domain transmission resource.

The following separately describes the time-domain transmission resource and the frequency-domain transmission resource.

1. Time-Domain Transmission Resource

A mechanism of determining, by the base station, the time-domain transmission resource may include but is not limited to the following two mechanisms.

Mechanism 1

The base station determines a time-domain pattern, and determines the time-domain transmission resource according to the time-domain pattern.

The mechanism 1 includes two steps. In step 1, the base station determines the time-domain pattern. In step 2, the base station determines the time-domain transmission resource according to the determined time-domain pattern.

Step 1. The base station determines the time-domain pattern.

For example, the base station determines that the time-domain pattern is one of a pattern 1 to a pattern 3. For different time-domain patterns, a time-domain element includes different quantities of symbols.

Pattern 1

As shown in FIG. 2, when the time-domain pattern is the pattern 1, each subframe includes two time-domain elements, a first time-domain element is located in the first slot, and a second time-domain element is located in the second slot. Optionally, when the first slot includes a symbol occupied by a legacy PDCCH, the first time-domain element does not include the symbol occupied by the legacy PDCCH. The legacy PDCCH is a PDCCH defined in Rel-8.

When a downlink system bandwidth is less than or equal to 10 resource blocks (RB), symbols that are used to transmit the legacy PDCCH and that are in one subframe are the first two, three, or four symbols in the subframe. When a downlink system bandwidth is greater than 10 RBs, symbols that are used to transmit the legacy PDCCH and that are in one subframe are the first one, two, or three OFDM symbols in the subframe. A quantity of symbols that are used to transmit the legacy PDCCH and that are in one subframe may be indicated by using a physical control format indicator channel (PCFICH) or higher layer signaling.

Pattern 2

As shown in FIG. 3, when the time-domain pattern is the pattern 2, each subframe includes four time-domain elements.

For a normal CP, a first time-domain element is located in a first symbol set {#0, #1, #2, #3}, that is, a set of symbols whose sequence numbers are {#0, #1, #2, #3}; a second time-domain element is located in a second symbol set {#4, #5, #6}, that is, a set of symbols whose sequence numbers are {#4, #5, #6}; a third time-domain element is located in a third symbol set {#7. #8, #9, #10}, that is, a set of symbols whose sequence numbers are {#7, #8, #9, #10}; and a fourth time-domain element is located in a fourth symbol set {#11, #12, #13}, that is, a set of symbols whose sequence numbers are {#11. #12. #13}. When the first symbol set includes a symbol occupied by a legacy PDCCH, optionally, the first time-domain element does not include the symbol occupied by the legacy PDCCH.

Alternatively, for a normal CP, a first time-domain element is located in a first symbol set {#0, #1, #2}, that is, a set of symbols whose sequence numbers are {#0, #1, #2}; a second time-domain element is located in a second symbol set {#3, #4, #5, #6}, that is, a set of symbols whose sequence numbers are {#3, #4, #5, #6}; a third time-domain element is located in a third symbol set {#7, #8, #9}, that is, a set of symbols whose sequence numbers are {#7, #8, #9}; and a fourth time-domain element is located in a fourth symbol set {#10, #11, #12, #13}, that is, a set of symbols whose sequence numbers are {#10, #11, #12, #13}. When the first symbol set includes a symbol occupied by a legacy PDCCH, optionally, the first time-domain element does not include the symbol occupied by the legacy PDCCH. When the second symbol set includes a symbol occupied by a legacy PDCCH, optionally, the second time-domain element does not include the symbol occupied by the legacy PDCCH.

For an extended CP, every three consecutive symbols form one time-domain element. A first time-domain element is located in a first symbol set {#0, #1, #2}, that is, a set of symbols whose sequence numbers are {#0, #1, #2}. A second time-domain element is located in a second symbol set {#3, #4, #5}, that is, a set of symbols whose sequence numbers are {#3, #4, #5}. A third time-domain element is located in a third symbol set {#6, #7, #8}, that is, a set of symbols whose sequence numbers are {#6, #7, #8}. A fourth time-domain element is located in a fourth symbol set {#9, #10, #11}, that is, a set of symbols whose sequence numbers are {#9, #10, #11}. When the first symbol set includes a symbol occupied by a legacy PDCCH, optionally, the first time-domain element does not include the symbol occupied by the legacy PDCCH. When the second symbol set includes a symbol occupied by a legacy PDCCH, optionally, the second time-domain element does not include the symbol occupied by the legacy PDCCH.

Pattern 3

When the time-domain pattern is the pattern 3, for a normal CP, each subframe includes seven time-domain elements, and every two consecutive symbols form one time-domain element.

A first time-domain element is located in a first symbol set {#0, #1}, that is, a symbol set {#0, #1}. A second time-domain element is located in a second symbol set {#2, #3}, that is, a symbol set {#2, #3}. A third time-domain element is located in a third symbol set {#4, #5}, that is, a symbol set {#4, #5}. A fourth time-domain element is located in a fourth symbol set {#6, #7}, that is, a symbol set {#6. #7}. A fifth time-domain element is located in a fifth symbol set {#8, #9}, that is, a symbol set {#8, #9}. A sixth time-domain element is located in a sixth symbol set {#10, #11}, that is, a symbol set {#10. #11}. A seventh time-domain element is located in a seventh symbol set {#12, #13}, that is, a symbol set {#12. #13}. When the first or the second symbol set includes a symbol occupied by a legacy PDCCH, optionally, the first or the second time-domain element does not include the symbol occupied by the legacy PDCCH. If all symbols in the first or the second symbol set are occupied by a legacy PDCCH, optionally, the first or the second time-domain element cannot be used to schedule a data packet.

For an extended CP, each subframe includes six time-domain elements, every two consecutive symbols form one time-domain element, and the time-domain elements do not include a symbol occupied by a legacy PDCCH. A first time-domain element is located in a first symbol set {#0, #1}, that is, a symbol set {#0, #1}. A second time-domain element is located in a second symbol set {#2, #3}, that is, a symbol set {#2, #3}. A third time-domain element is located in a third symbol set {#4, #5}, that is, a symbol set {#4, #5}. A fourth time-domain element is located in a fourth symbol set {#6. #7}, that is, a symbol set {#6, #7}. A fifth time-domain element is located in a fifth symbol set {#8, #9}, that is, a symbol set {#8, #9}. A sixth time-domain element is located in a sixth symbol set {#10, #11}, that is, a symbol set {#10, #11}. When the first or the second symbol set includes a symbol occupied by a legacy PDCCH, optionally, the first or the second time-domain element does not include the symbol occupied by the legacy PDCCH. If all symbols in the first or the second symbol set are occupied by a legacy PDCCH, optionally, the first or the second time-domain element cannot be used to schedule a data packet.

Optionally, for the short-TTI data transmission, the base station determines to always use the pattern 1, the pattern 2, or the pattern 3. That is, the base station does not change the selected time-domain pattern according to any change.

Optionally, when a standard supports multiple time-domain patterns, the base station selects one time-domain pattern from the multiple time-domain patterns. For example, the base station selects one time-domain pattern from the pattern 1, the pattern 2, and the pattern 3.

The base station may determine the time-domain pattern according to the system bandwidth, and a higher system bandwidth indicates a smaller quantity of symbols included in a time-domain element provided in the selected time-domain pattern; or the base station determines the time-domain pattern according to the available short-TTI data transmission bandwidth, and a higher available short-TTI data transmission bandwidth indicates a smaller quantity of symbols included in a time-domain element provided in the selected time-domain pattern.

Optionally, the base station determines the time-domain pattern according to at least one of the following rules:

when the system bandwidth or the available short-TTI data transmission bandwidth is less than or equal to 10 RBs, the base station determines that the time-domain pattern is the pattern 1; when the system bandwidth or the available short-TTI data transmission bandwidth is 11 to 26 RBs, the base station determines that the time-domain pattern is the pattern 1 or the pattern 2; when the system bandwidth or the available short-TTI data transmission bandwidth is 27 to 63 RBs, the base station determines that the time-domain pattern is the pattern 1, the pattern 2, or the pattern 3; or when the system bandwidth or the available short-TTI data transmission bandwidth is 64 to 110 RBs, the base station determines that the time-domain pattern is the pattern 3.

For example, when the system bandwidth or the available short-TTI data transmission bandwidth is 100 RBs or 75 RBs, the base station determines that the time-domain pattern is the pattern 3; and/or when the system bandwidth or the available short-TTI data transmission bandwidth is 50 RBs or 25 RBs, the base station determines that the time-domain pattern is the pattern 2; and/or when the system bandwidth is 15 RBs, the base station determines that the time-domain pattern is the pattern 1.

Step 2. The base station determines the time-domain transmission resource according to the determined time-domain pattern.

Specifically, the base station selects, from the multiple time-domain elements included in the determined time-domain pattern, one time-domain element as the time-domain transmission resource. For example, the base station determines that the time-domain pattern is the pattern 1. Then, the base station selects, from the two time-domain elements included in the pattern 1, the second time-domain element (that is, the second slot) as the time-domain transmission resource used to perform the data transmission with the terminal device.

Optionally, to identify the selected time-domain element, for downlink short-TTI data transmission, the base station may send the DCI on a selected downlink time-domain element. In this way, the terminal device may use the time-domain element used to send the DCI as the time-domain transmission resource used to perform the short-TTI data transmission with the base station.

For uplink short-TTI data transmission, the base station sends the DCI, and the $k^{th}$ symbol following the first symbol occupied by the DCI or the $k^{th}$ symbol following the last symbol occupied by the DCI is the first symbol occupied by a selected uplink time-domain element (k is a positive integer). In this way, the terminal device may use the uplink time-domain element to which the $k^{th}$ symbol following the first symbol occupied by the DCI or the $k^{th}$ symbol following the last symbol occupied by the DCI belongs as the time-domain transmission resource used to perform the short-TTI data transmission with the base station.

Mechanism 2

The base station determines an starting symbol and a quantity of symbols of the time-domain transmission resource.

1. The base station determines the starting symbol of the time-domain transmission resource.

The base station uses a reference symbol as the starting symbol.

For downlink data transmission, the reference symbol may be the first symbol occupied by the DCI, the last symbol occupied by the DCI, the $k^{th}$ symbol following the first symbol occupied by the DCI, or the $k^{th}$ symbol following the last symbol occupied by the DCI, k is a positive integer, and the DCI includes information used to indicate the downlink data transmission.

For uplink data transmission, the reference symbol may be the $k^{th}$ symbol following the first symbol occupied by the DCI or the $k^{th}$ symbol following the last symbol occupied by the DCI, k is a positive integer, and the DCI includes information used to indicate the uplink data packet.

2. The base station determines the quantity of symbols of the time-domain transmission resource. An optional manner includes but is not limited to the following two manners.

Manner 1: fixed length

The base station may determine that the time-domain transmission resource occupies $N_{symb}$ symbols or one slot in the time domain, and $N_{symb}$ is a positive integer less than or equal to 7.

Manner 2: Determine a length according to a bandwidth.

The base station may determine, according to the system bandwidth, the quantity of symbols of the time-domain transmission resource, where a higher system bandwidth indicates a smaller quantity of occupied symbols; or the base station may determine, according to the available short-TTI data transmission bandwidth, the quantity of symbols of the time-domain transmission resource, where a higher available short-TTI data transmission bandwidth indicates a smaller quantity of occupied symbols.

Optionally, the base station determines a length of the time-domain transmission resource according to at least one of the following rules: When the system bandwidth or the available short-TTI data transmission bandwidth is less than or equal to 10 RBs, the base station determines that the time-domain transmission resource occupies one slot; when the system bandwidth or the available short-TTI data transmission bandwidth is 11 to 26 RBs, the base station determines that the time-domain transmission resource occupies three to four symbols or one slot; when the system bandwidth or the available short-TTI data transmission bandwidth is 27 to 63 RBs, the base station determines that the time-domain transmission resource occupies two, three, or four symbols, or one slot; or when the system bandwidth or the available short-TTI data transmission bandwidth is 64 to 110 RBs, the base station determines that the time-domain transmission resource occupies one or two symbols.

For example, when the system bandwidth or the available short-TTI data transmission bandwidth is 100 RBs or 75 RBs, the base station determines that the time-domain transmission resource occupies one or two symbols; and/or when the system bandwidth or the available short-TTI data transmission bandwidth is 50 RBs, the base station determines that the time-domain transmission resource occupies two, three, or four symbols, or one slot; and/or when the system bandwidth or the available short-TTI data transmission bandwidth is 25 RBs or 15 RBs, the base station determines that the time-domain transmission resource occupies three or four symbols, or one slot.

Another optional rule includes:

the base station determines, according to one of the following formulas, the quantity $N_{symb}$ of symbols of the time-domain transmission resource used to perform the data transmission with the terminal device:

$$N_{symb} = F \times \left\lceil \frac{L_{MAX} \times M_{CCE} + M_{ex}}{N_{RB} \times 12} \right\rceil, \text{ or}$$

$$N_{symb} = F \times \left\lceil \frac{L_{MAX} \times M_{CCE-RB} + M_{exRB}}{N_{RB}} \right\rceil.$$

$N_{RB}$ is the system bandwidth or the available short-TTI data transmission bandwidth, $L_{MAX}$ is a maximum aggregation level of a PDCCH, $M_{CCE}$ represents that one CCE includes $M_{CCE}$ REs, $M_{ex}$ is a quantity of extra REs, and may be notified to the terminal device by using higher layer signaling after being predefined or being configured by the base station, $M_{CCE-RB}$ represents that one CCE includes $M_{CCE-RB}$ RBs, and $M_{exRB}$ is a quantity of extra RBs, and may be notified to the terminal device after being predefined or being configured by the base station. F is a constant, and is a coefficient factor. For example, F=2, or $$F = \frac{1}{C}.$$

C is a percentage of target PDCCH overheads on a symbol. For example, C=50%. It should be noted that $M_{ex}$ and $M_{exRB}$ may be 0, that is, impact of $M_{ex}$ and $M_{exRB}$ is not considered, and F may be 1, that is, impact of F is not considered.

For example, when $L_{MAX}=8$, $M_{CCE-RB}=3$, $M_{exRB}=0$, F=2, and $N_{RB}=100$, 75, 50, or 25, the base station determines that $N_{symb}$ is 2. When $L_{MAX}=8$, $M_{CCE-RB}=3$, $M_{exRB}=0$, F=2, and $N_{RB}=15$, the base station determines that $N_{symb}$ is 4.

By using the manner 2, a lower system bandwidth or available short-TTI data transmission bandwidth indicates a longer time-domain transmission resource used to perform the data transmission with the terminal device. In this way, a problem that data transmission resources are insufficient due to limited frequency-domain resources under a low bandwidth is avoided.

An information bit that is used to indicate the time-domain transmission resource and that is in the DCI may be null. That is, the DCI may not include an information bit used to explicitly indicate the time-domain transmission resource, but the terminal device can still determine the used time-domain transmission resource according to the DCI.

The foregoing describes an optional implementation solution of determining, by the base station, the time-domain transmission resource, and the following describes an optional implementation solution of determining, by the base station, the frequency-domain transmission resource.

2. Frequency-Domain Transmission Resource

A mechanism of determining, by the base station, the frequency-domain transmission resource may include but is not limited to the following three mechanisms.

Mechanism 1

The base station determines that the frequency-domain transmission resource is the system bandwidth or the available short-TTI data transmission bandwidth. That is, the base station determines that the short-TTI data transmission performed with the terminal device occupies all frequency-domain resources of the system bandwidth, or occupies all frequency-domain resources of the available short-TTI data transmission bandwidth.

Mechanism 2

The base station determines that a size of the frequency-domain transmission resource is a particular bandwidth. The particular bandwidth may be 3, 4, 5, 10, 14, 15, 20, or 25 RBs.

The base station may use a reference RB as an starting RB of the frequency-domain transmission resource. The reference RB may be the $n^{th}$ (n is an integer, and preferably, n=0) RB following the first RB occupied by the DCI or the $m^{th}$ (m is an integer greater than or equal to 0, and preferably, m=1) RB following the last RB occupied by the DCI.

In the mechanism 1 and the mechanism 2, an information bit that is used to indicate the frequency-domain transmission resource and that is in the DCI may be null. That is, the DCI may not include an information bit used to explicitly indicate the frequency-domain transmission resource, but the terminal device can still determine the used frequency-domain transmission resource according to the DCI.

Mechanism 3

The base station determines a frequency-domain resource scheduling granularity, and determines the frequency-domain transmission resource according to the frequency-domain resource scheduling granularity.

The base station determines that the frequency-domain resource scheduling granularity is an integer multiple of a frequency-domain resource scheduling granularity in a 1 ms data transmission mode. For example, the base station determines the frequency-domain resource scheduling granularity according to any one of the following rules; When the system bandwidth is less than or equal to 10 RBs, the base station determines that the frequency-domain resource scheduling granularity is Q1; when the system bandwidth is 11 to 26 RBs, the base station determines that the frequency-domain resource scheduling granularity is 2× Q2; when the system bandwidth is 27 to 63 RBs, the base station determines that the frequency-domain resource scheduling granularity is 3× Q3; or when the system bandwidth is 64 to 110 RBs, the base station determines that the frequency-domain resource scheduling granularity is 4× Q4, Q1, Q2. Q3, and Q4 are integers greater than 1. Preferably, Q1=Q2=Q3=Q4.

The base station may determine the frequency-domain resource scheduling granularity according to the system bandwidth.

Optionally, a higher system bandwidth indicates a larger quantity of RBs included in the frequency-domain resource scheduling granularity.

For example, the base station determines the frequency-domain resource scheduling granularity according to any one of the following rules: When the system bandwidth is six RBs, the base station determines that the frequency-domain resource scheduling granularity is three RBs; when the system bandwidth is 15 RBs, the base station determines that the frequency-domain resource scheduling granularity is five RBs; when the system bandwidth is 25 RBs, the base station determines that the frequency-domain resource scheduling granularity is 5 or 10 RBs; when the system bandwidth is 50 RBs, the base station determines that the frequency-domain resource scheduling granularity is 10 RBs; when the system bandwidth is 75 RBs, the base station determines that the frequency-domain resource scheduling granularity is 15 RBs; or when the system bandwidth is 100 RBs, the base station determines that the frequency-domain resource scheduling granularity is 20 or 25 RBs.

The base station may determine the frequency-domain resource scheduling granularity according to the available short-TTI data transmission bandwidth. Optionally, a higher available short-TTI data transmission bandwidth indicates a larger quantity of RBs included in the frequency-domain resource scheduling granularity.

For example, the base station determines the frequency-domain resource scheduling granularity according to any one of the following rules: When the available short-TTI data transmission bandwidth is six RBs, the base station determines that the frequency-domain resource scheduling granularity is three RBs; when the available short-TTI data transmission bandwidth is 15 RBs, the base station determines that the frequency-domain resource scheduling granularity is five RBs; when the available short-TTI data transmission bandwidth is 25 RBs, the base station determines that the frequency-domain resource scheduling granularity is 5 or 10 RBs; when the available short-TTI data transmission bandwidth is 50 RBs, the base station determines that the frequency-domain resource scheduling granularity is 10 RBs, when the available short-TTI data transmission bandwidth is 75 RBs, the base station determines that the frequency-domain resource scheduling granularity is 15 RBs; or when the available short-TTI data transmission bandwidth is 100 RBs, the base station determines that the frequency-domain resource scheduling granularity is 20 or 25 RBs.

Alternatively, the base station may determine the frequency-domain resource scheduling granularity according to at least one of the following rules:

when the system bandwidth is less than or equal to 10 RBs, the base station determines that the frequency-domain resource scheduling granularity is $N_{RB}$ RBs; when the system bandwidth is 11 to 26 RBs, the base station determines that the frequency-domain resource scheduling granularity is $$N_{RB} \text{ or } \left\lfloor \frac{N_{RB}}{2} \right\rfloor RBs;$$

when the system bandwidth is 27 to 63 RBs, the base station determines that the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the base station determines that the frequency-domain resource scheduling granularity is $$\left\lfloor \frac{N_{RB}}{4} \right\rfloor \text{ or } \left\lfloor \frac{N_{RB}}{5} \right\rfloor RBs,$$

where ⌊ ⌋ represents rounding down, and $N_{RB}$ is a quantity of RBs included in the system bandwidth. For uplink data transmission, $N_{RB}$ is a quantity of RBs included in an uplink system bandwidth. For downlink data transmission, $N_{RB}$ is a quantity of RBs included in a downlink system bandwidth.

Alternatively, the base station may determine the frequency-domain resource scheduling granularity according to at least one of the following rules:

when the available short-TTI data transmission bandwidth is less than or equal to 10 RBs, the base station determines that the frequency-domain resource scheduling granularity is $N_{RB}$ RBs; when the available short-TTI data transmission bandwidth is 11 to 26 RBs, the base station determines that the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the base station determines that the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the base station determines that the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $\lfloor \ \rfloor$ represents rounding down, and $N_{RB}$ is a quantity of RBs included in the available short-TTI data transmission bandwidth. For uplink data transmission, $N_{RB}$ is a quantity of RBs included in an available uplink short-TTI data transmission bandwidth. For downlink data transmission, $N_{RB}$ is a quantity of RBs included in an available downlink short-TTI data transmission bandwidth.

After determining the frequency-domain resource scheduling granularity, the base station may determine the frequency-domain transmission resource in one of the following manners, and the frequency-domain transmission resource occupies one or more frequency-domain resource scheduling granularities.

Manner 1

The base station uses a size of the frequency-domain resource scheduling granularity as a size of the frequency-domain transmission resource, and uses a reference RB as an starting RB of the frequency-domain transmission resource.

The reference RB is the $n^{th}$ (n is an integer, and preferably, n=0) RB following the first RB occupied by the DCI or the $m^{th}$ (m is an integer greater than or equal to 0, and preferably, m=1) RB following the last RB occupied by the DCI.

In the manner 1, an information bit that is used to indicate the frequency-domain transmission resource and that is in the DCI may be null. That is, the DCI may not include an information bit used to explicitly indicate the frequency-domain transmission resource, but the terminal device can still determine the used frequency-domain transmission resource according to the DCI.

Manner 2

The base station uses a size of the frequency-domain resource scheduling granularity as a size of the frequency-domain transmission resource, and determines a location of the frequency-domain transmission resource.

For example, a downlink system bandwidth is 20 MHz (including 100 RBs), and the frequency-domain resource scheduling granularity is 20 RBs. In this case, the base station needs to use only three bits to indicate an starting location of the frequency-domain transmission resource. There are only five possibilities (an RB number is 0, 20, 40, 60, or 80) for the frequency-domain starting location, and three bits may indicate eight states. For example, '000' represents that the frequency-domain starting location is an RB whose RB number is 0, and '010' represents that the frequency-domain starting location is an RB whose RB number is 40.

In the manner 2, the DCI may include information used to indicate the location of the frequency-domain transmission resource.

Manner 3

The base station uses a reference RB as an starting RB of the frequency-domain transmission resource, and determines a size of a bandwidth occupied by the frequency-domain transmission resource (that is, a length of the frequency-domain transmission resource).

The reference RB is the $n^{th}$ (n is an integer, and preferably, n=0) RB following the first RB occupied by the DCI or the $m^{th}$ (m is an integer greater than or equal to 0, and preferably, m=1) RB following the last RB occupied by the DCI.

The base station may determine that the frequency-domain transmission resource is continuous. For example, a downlink system bandwidth is 20 MHz (including 100 RBs), and the frequency-domain resource scheduling granularity is 20 RBs. In this case, the base station needs to use only three bits to indicate a frequency-domain length. There are only five possibilities (20, 40, 60, 80, or 100) for the frequency-domain length, and three bits may indicate eight states. For example, '000' represents that the length of the frequency-domain transmission resource is 20 RBs, and '010' represents that the length of the frequency-domain transmission resource is 60 RBs.

In the manner 3, the DCI may include information used to indicate a size of a bandwidth occupied by the frequency-domain transmission resource, and the information may be generated by the base station according to the frequency-domain resource scheduling granularity.

Manner 4

The base station uses multiple transmission resource groups, for example, several resource block groups (RBG), included in the system bandwidth as the frequency-domain transmission resource.

The DCI may include information used to indicate locations, in the system bandwidth, of the several transmission resource groups included in the frequency-domain transmission resource.

For example, the base station determines the resource block groups (RBG) occupied by the frequency-domain transmission resource, and indicates the occupied RBGs by means of bit mapping. In this case, the frequency-domain resource scheduling granularity is an RBG. In this solution, the DCI includes bitmap information. For example, a downlink system bandwidth is 20 MHz (including 100 RBs), and the frequency-domain resource scheduling granularity is 20 RBs. Then, the base station needs to use only five bits to indicate the used RBGs. For example, '00001' represents that the first RBG is occupied, and '01111' represents that the first to the fourth RBGs are occupied.

The base station may first determine the time-domain transmission resource, and then determine the frequency-domain transmission resource; or may first determine the frequency-domain transmission resource, and then determine the time-domain transmission resource; or may determine the frequency-domain transmission resource and the time-domain transmission resource at the same time.

In step S112, the base station sends the DCI to the terminal device. The DCI is used to indicate the determined data transmission resource. That is, the DCI indicates the data transmission resource used to perform the short-TTI data transmission with the terminal device.

For the manner 1 in the mechanism 1, the mechanism 2, and the mechanism 3 of determining the frequency-domain transmission resource, the information bit that is used to indicate the frequency-domain transmission resource and that is in the DCI may be null. That is, the DCI may not include the information bit used to explicitly indicate the frequency-domain transmission resource, but the terminal device can still determine the used frequency-domain transmission resource according to the DCI. For the manner 2, the manner 3, and the manner 4 in the mechanism 3 of determining the frequency-domain transmission resource, the base station needs to add only 3-bit or 5-bit indication information to the DCI, thereby greatly reducing a quantity of information bits in the DCI, and effectively reducing signaling overheads of a PDCCH during the short-TTI data transmission.

The DCI may be carried on the PDCCH. When the DCI is used to instruct the terminal device to receive downlink short-TTI data transmission, the base station determines that time-domain and frequency-domain resources of the PDCCH are located in a first area, and the first area is a time-domain and frequency-domain resource area indicated by RA information in the DCI. Preferably, mapping is performed for the PDCCH from the first symbol in the first area, and mapping is performed on an available resource of a next symbol after an available resource of the first symbol is fully occupied. In this way, the terminal device can quickly decode the PDCCH.

When the DCI is used to instruct the terminal device to perform uplink short-TTI data transmission, the base station may determine the time-domain and frequency-domain resources of the PDCCH according to a predefined rule, or the base station configures the time-domain and frequency-domain resources of the PDCCH by using higher layer signaling or physical layer signaling.

In addition, to obtain a frequency-domain diversity gain, the base station may configure symbol-level frequency hopping. In this way, the RA information includes information about the symbol-level frequency hopping. The symbol-level frequency hopping is inter-symbol frequency hopping on the data transmission resource. Specifically, the base station determines frequency-domain transmission resources on different symbols according to a frequency hopping rule. The frequency-domain transmission resources on the different symbols may be different. The frequency hopping rule may be predefined, or after the base station configures a frequency hopping rule, the base station sends signaling indicating the frequency hopping rule to the terminal device.

In S113, the base station performs the data transmission with the terminal device on the determined data transmission resource.

For downlink short-TTI data transmission, the base station sends a downlink short-TTI data packet on the data transmission resource.

For uplink short-TTI data transmission, the base station receives an uplink short-TTI data packet on the data transmission resource.

Embodiment 2

FIG. 4 is a flowchart of a data transmission method according to Embodiment 2. As shown in FIG. 4, the method includes the following steps.

S411. A terminal device receives DCI sent by a base station, where the DCI is used to indicate a data transmission resource.

S412. The terminal device determines the data transmission resource according to the DCI.

S413. The terminal device performs data transmission with the base station on the data transmission resource.

The data transmission resource may be a short-TTI data transmission resource. For a definition of the short-TTI data transmission resource, refer to Embodiment 1.

Before step S411, the method may further include the following steps.

S401. The terminal device receives higher layer signaling or physical layer signaling that is sent by the base station, where the signaling indicates to the terminal device that the data transmission resource used to perform the data transmission with the base station is the short-TTI data transmission resource, that is, the terminal device performs short-TTI data transmission with the base station.

S402. The terminal device determines, according to the higher layer signaling or the physical layer signaling, to perform short-TTI data transmission with the base station.

For optional implementations of the higher layer signaling and the physical layer signaling, refer to the corresponding descriptions in Embodiment 1.

Optionally, before step S411 of receiving the DCI by the terminal device, the method further includes step S403 and step S404.

S403. The terminal device receives information that is about the available short-TTI data transmission resource and that is sent by the base station.

S404. The terminal device determines the available short-TTI data transmission resource according to the information.

An execution sequence between the two steps of step S403 and step S404 and the two steps of step S401 and step S402 is not limited. Step S401 and step S402 may be performed before step S403 and step S404, or step S403 and step S404 may be performed before step S401 and step S402, or the two steps of step S403 and step S404 and the two steps of step S401 and step S402 may be performed at the same time.

Because there are multiple TTI-based data transmission modes in a system, the base station needs to determine the available short-TTI data transmission resource. The available short-TTI data transmission resource may include a frequency-domain bandwidth that can be occupied by the short-TTI data transmission and/or a time-domain resource that can be occupied by the short-TTI data transmission. The frequency-domain bandwidth that can be occupied by the short-TTI data transmission may be briefly referred to as an "available short-TTI data transmission bandwidth". The available short-TTI data transmission bandwidth is a frequency-domain resource that can be occupied by the short-TTI data transmission resource.

For a manner of multiplexing between the available short-TTI data transmission resource and another available transmission resource, for example, a data transmission resource with a TTI of 1 ms, information related to the short-TTI data transmission resource, and a HARQ time sequence, refer to the corresponding descriptions in Embodiment 1, and details are not described herein again.

In step S411, the terminal device receives the DCI sent by the base station, and the DCI is used to indicate the data transmission resource. That is, the DCI indicates the data transmission resource used to perform the short-TTI data transmission with the base station.

For a manner 1 in a mechanism 1, a mechanism 2, and a mechanism 3 of determining the frequency-domain transmission resource that are described in the following, an information bit that is used to indicate the frequency-domain transmission resource and that is in the DCI may be null. That is, the DCI may not include the information bit used to explicitly indicate the frequency-domain transmission resource, but the terminal device can still determine the used frequency-domain transmission resource according to the DCI. For a manner 2, a manner 3, and a manner 4 in the mechanism 3 of determining the frequency-domain transmission resource, the base station needs to add only 3-bit or 5-bit indication information to the DCI, thereby greatly reducing a quantity of information bits in the DCI, and effectively reducing signaling overheads of a PDCCH during the short-TTI data transmission.

The DCI may be carried on the PDCCH. When the DCI is used to instruct the terminal device to receive downlink short-TTI data transmission, time-domain and frequency-domain resources of the PDCCH are located in a first area, and the first area is a time-domain and frequency-domain resource area indicated by RA information in the DCI. Preferably, mapping is performed for the PDCCH from the first symbol in the first area, and mapping is performed on an available resource of a next symbol after an available resource of the first symbol is fully occupied. In this way, the terminal device can quickly decode the PDCCH.

When the DCI is used to instruct the terminal device to perform uplink short-TTI data transmission, the terminal device may determine the time-domain and frequency-domain resources of the PDCCH according to a predefined rule, or the base station notifies the time-domain and frequency-domain resources of the PDCCH to the terminal device by using higher layer signaling or physical layer signaling.

In addition, to obtain a frequency-domain diversity gain, symbol-level frequency hopping may be applied to the data transmission resource indicated by the DCI. In this way, the RA information includes information about the symbol-level frequency hopping. The symbol-level frequency hopping is inter-symbol frequency hopping on the data transmission resource, that is, inter-symbol frequency hopping in the short-TTI data transmission. Specifically, the base station determines frequency-domain transmission resources on different symbols according to a frequency hopping rule. The frequency-domain transmission resources on the different symbols may be different. The frequency hopping rule may be predefined, or the terminal device receives signaling that indicates the frequency hopping rule and that is sent by the base station.

The terminal device may perform the following steps when receiving the DCI.

Step 1. The terminal device determines a PDCCH search space.

The search space is a set of PDCCH candidates. The terminal device needs to monitor each PDCCH candidate. Therefore, the search space is a PDCCH set monitored by the terminal device. Each aggregation level corresponds to one search space.

Step 2. The terminal device performs blind detection on PDCCHs in the PDCCH search space.

The terminal device performs blind detection on the PDCCHs in the search space according to a quantity of bits in the DCI, and downlink control information that is obtained by means of searching and on which CRC check has been successfully performed is the DCI.

The following further describes step S412 in detail.

In step S412, the data transmission resource includes a time-domain transmission resource and a frequency-domain transmission resource. The time-domain transmission resource is a time-domain resource occupied by the data transmission resource, and the frequency-domain transmission resource is a frequency-domain resource occupied by the data transmission resource. The determining, by the terminal device, the data transmission resource according to the DCI includes:

determining, by the terminal device, the time-domain transmission resource according to the DCI; and determining, by the terminal device, the frequency-domain transmission resource.

The following separately describes the time-domain transmission resource and the frequency-domain transmission resource.

1. Time-Domain Transmission Resource

A mechanism of determining, by the terminal device, the time-domain transmission resource may include but is not limited to a mechanism 1 and a mechanism 2. The mechanism 1 corresponds to the mechanism 1 of determining, by the base station, the time-domain transmission resource in Embodiment 1, and the mechanism 2 corresponds to the mechanism 2 of determining, by the base station, the time-domain transmission resource in Embodiment 1.

Mechanism 1

The terminal device determines a time-domain pattern, and determines, according to the DCI and in multiple time-domain elements included in the determined time-domain pattern, one time-domain element as the time-domain transmission resource.

The mechanism 1 includes two steps. In step 1, the terminal device determines the time-domain pattern. In step 2, the terminal device determines, according to the DCI and in the multiple time-domain elements included in the determined time-domain pattern, one time-domain element as the time-domain transmission resource. The following separately describes the two steps.

Step 1. The terminal device determines the time-domain pattern.

The time-domain pattern determined by the terminal device may be one of the pattern 1 to the pattern 3 that are described in Embodiment 1. For specific descriptions of the pattern 1 to the pattern 3, refer to Embodiment 1, and details are not described herein again.

Optionally, for the short-TTI data transmission, similar to the processing method performed by the base station in Embodiment 1, the terminal device determines to always use the pattern 1, the pattern 2, or the pattern 3. That is, the terminal device does not change the selected time-domain pattern according to any change. When a standard supports multiple time-domain patterns, the terminal device selects one time-domain pattern from the multiple time-domain patterns. For example, the terminal device selects one time-domain pattern from the pattern 1, the pattern 2, and the pattern 3.

The terminal device may determine the time-domain pattern according to a system bandwidth, where a higher system bandwidth indicates a smaller quantity of symbols included in the time-domain element included in the determined time-domain pattern; or the terminal device may determine the time-domain pattern according to an available short-TTI data transmission bandwidth, where a higher available short-TTI data transmission bandwidth indicates a smaller quantity of symbols included in the time-domain element included in the determined time-domain pattern.

When determining the time-domain pattern, the terminal device needs to use a rule the same as that of the base station. In this way, it can be ensured that the time-domain pattern determined by the base station is consistent with the time-domain pattern determined by the terminal device, and it is further ensured that the base station and the terminal device perform the short-TTI data transmission on a same short-TTI data transmission resource.

For the rule according to which the terminal device determines the time-domain pattern, refer to the description of the rule that can be used by the base station in Embodiment 1, and details are not described herein again.

Step 2. The terminal device determines, according to the DCI and in multiple time-domain elements included in the determined time-domain pattern, one time-domain element as the time-domain transmission resource.

For example, for downlink short-TTI data transmission, the terminal device may use a time-domain element in which the DCI is located as the time-domain transmission resource used to perform the short-TTI data transmission with the base station.

For another example, for uplink short-TTI data transmission, the terminal device may use an uplink time-domain element in which the $k^{th}$ symbol following the first symbol occupied by the DCI or the $k^{th}$ symbol following the last symbol occupied by the DCI is located as the time-domain transmission resource used to perform the short-TTI data transmission with the base station.

Mechanism 2

The terminal device determines, according to the DCI, an starting symbol and a quantity of symbols of the time-domain transmission resource.

1. The terminal device determines the starting symbol of the time-domain transmission resource.

The terminal device determines that the starting symbol is a reference symbol. For a definition of the reference symbol, refer to Embodiment 1, and details are not described herein again.

2. The terminal device determines the quantity of symbols of the time-domain transmission resource. Corresponding to the two manners that can be used by the base station in Embodiment 1, a manner that can be used by the terminal device includes but is not limited to the following two manners.

Manner 1: Fixed Length (Corresponding to the Manner 1 of the Base Station)

The terminal device may determine that the time-domain transmission resource occupies $N_{symb}$ symbols or one slot in the time domain, and $N_{symb}$ is a positive integer less than or equal to 7.

If the manner 1 is used, the fixed length determined by the terminal device needs to be equal to the fixed length determined by the base station. The fixed length may be agreed on by means of a protocol, or may be notified by the base station to the terminal device by using higher layer signaling or physical layer signaling.

Manner 2: Determine a Length According to a Bandwidth (Corresponding to the Manner 2 of the Base Station)

The terminal device may determine, according to the system bandwidth, the quantity of symbols of the time-domain transmission resource, where a higher system bandwidth indicates a smaller quantity of occupied symbols; or the terminal device may determine, according to the available short-TTI data transmission bandwidth, the quantity of symbols of the time-domain transmission resource, where a higher available short-TTI data transmission bandwidth indicates a smaller quantity of occupied symbols.

A rule according to which the terminal device determines the length of the time-domain transmission resource needs to be the same as the rule used by the base station, to ensure that the short-TTI data transmission resource used by the terminal device is the same as the short-TTI data transmission resource allocated by the base station, and further ensure the short-TTI data transmission between the terminal device and the base station. For the rule that can be used by the terminal device, refer to the rule according to which the base station determines the length of the time-domain transmission resource in Embodiment 1, and details are not described herein again.

The foregoing describes an optional implementation solution of determining, by the terminal device, the time-domain transmission resource, and the following describes an optional implementation solution of determining, by the terminal device, the frequency-domain transmission resource.

For the foregoing two mechanisms, an information bit that is used to indicate the time-domain transmission resource and that is in the DCI may be null. That is, the DCI may not include an information bit used to explicitly indicate the time-domain transmission resource, but the terminal device can still determine the used time-domain transmission resource according to the DCI.

2. Frequency-domain transmission resource

A mechanism of determining, by the terminal device, the frequency-domain transmission resource may include but is not limited to the following three mechanisms. The mechanism used by the terminal device needs to be the same as the mechanism used by the base station, to ensure that the frequency-domain transmission resource determined by the terminal device is the same as the frequency-domain transmission resource determined by the base station.

Mechanism 1 (Corresponding to the Mechanism 1 of Determining, by the Base Station, the Frequency-Domain Transmission Resource in Embodiment 1)

The terminal device determines that the frequency-domain transmission resource is the system bandwidth or the available short-TTI data transmission bandwidth. That is, the terminal device determines that the short-TTI data transmission performed with the base station occupies all frequency-domain resources of the system bandwidth, or occupies all frequency-domain resources of the available short-TTI data transmission bandwidth.

The mechanism may be agreed on by means of a protocol, or may be notified by the base station to the terminal device by using higher layer signaling or physical layer signaling.

Mechanism 2 (Corresponding to the Mechanism 2 of Determining, by the Base Station, the Frequency-Domain Transmission Resource in Embodiment 1)

The terminal device determines that a size of the frequency-domain transmission resource is a particular bandwidth. The particular bandwidth may be 3, 4, 5, 10, 14, 15, 20, or 25 RBs.

The terminal device may determine that an starting RB of the frequency-domain transmission resource is a reference RB. The reference RB may be the $n^{th}$ (n is an integer, and preferably, n=0) RB following the first RB occupied by the DCI or the m$^{th}$ (m is an integer greater than or equal to 0, and preferably, m=1) RB following the last RB occupied by the DCI.

A definition of the reference RB and a definition of the particular bandwidth may be agreed on by means of a protocol, or may be notified by the base station to the terminal device by using higher layer signaling or physical layer signaling.

In the mechanism 1 and the mechanism 2, an information bit that is used to indicate the frequency-domain transmission resource and that is in the DCI may be null. That is, the DCI may not include an information bit used to explicitly indicate the frequency-domain transmission resource, but the terminal device can still determine the used frequency-domain transmission resource according to the DCI.

Mechanism 3 (corresponding to the mechanism 3 of determining, by the base station, the frequency-domain transmission resource in Embodiment 1)

The terminal device determines a frequency-domain resource scheduling granularity, and determines the frequency-domain transmission resource according to the frequency-domain resource scheduling granularity.

The terminal device determines that the frequency-domain resource scheduling granularity is an integer multiple of a frequency-domain resource scheduling granularity in a 1 ms data transmission mode. For example, the terminal device determines the frequency-domain resource scheduling granularity according to any one of the following rules: When the system bandwidth is less than or equal to 10 RBs, the terminal device determines that the frequency-domain resource scheduling granularity is Q1; when the system bandwidth is 11 to 26 RBs, the terminal device determines that the frequency-domain resource scheduling granularity is 2×Q2; when the system bandwidth is 27 to 63 RBs, the terminal device determines that the frequency-domain resource scheduling granularity is 3× Q3; or when the system bandwidth is 64 to 110 RBs, the terminal device determines that the frequency-domain resource scheduling granularity is 4×Q4. Q1, Q2, Q3, and Q4 are integers greater than 1. Preferably, Q1=Q2=Q3=Q4.

The terminal device may determine the frequency-domain resource scheduling granularity according to the system bandwidth or the available short-TTI data transmission bandwidth.

Optionally, a higher system bandwidth indicates a larger quantity of RBs included in the frequency-domain resource scheduling granularity.

For example, the terminal device determines the frequency-domain resource scheduling granularity according to at least one of the following rules: When the system bandwidth is six RBs, the terminal device determines that the frequency-domain resource scheduling granularity is three RBs; when the system bandwidth is 15 RBs, the terminal device determines that the frequency-domain resource scheduling granularity is five RBs; when the system bandwidth is 25 RBs, the terminal device determines that the frequency-domain resource scheduling granularity is 5 or 10 RBs; when the system bandwidth is 50 RBs, the terminal device determines that the frequency-domain resource scheduling granularity is 10 RBs; when the system bandwidth is 75 RBs, the terminal device determines that the frequency-domain resource scheduling granularity is 15 RBs; or when the system bandwidth is 100 RBs, the terminal device determines that the frequency-domain resource scheduling granularity is 20 or 25 RBs.

Optionally, a higher available short-TTI data transmission bandwidth indicates a larger quantity of RBs included in the frequency-domain resource scheduling granularity.

For example, the terminal device determines the frequency-domain resource scheduling granularity according to at least one of the following rules: When the available short-TTI data transmission bandwidth is six RBs, the terminal device determines that the frequency-domain resource scheduling granularity is three RBs; when the available short-TTI data transmission bandwidth is 15 RBs, the terminal device determines that the frequency-domain resource scheduling granularity is five RBs; when the available short-TTI data transmission bandwidth is 25 RBs, the terminal device determines that the frequency-domain resource scheduling granularity is 5 or 10 RBs; when the available short-TTI data transmission bandwidth is 50 RBs, the terminal device determines that the frequency-domain resource scheduling granularity is 10 RBs; when the available short-TTI data transmission bandwidth is 75 RBs, the terminal device determines that the frequency-domain resource scheduling granularity is 15 RBs; or when the available short-TTI data transmission bandwidth is 100 RBs, the terminal device determines that the frequency-domain resource scheduling granularity is 20 or 25 RBs.

Optionally, the terminal device may determine the frequency-domain resource scheduling granularity according to at least one of the following rules:

when the system bandwidth is less than or equal to 10 RBs, the terminal device determines that the frequency-domain resource scheduling granularity is $N_{RB}$ RBs; when the system bandwidth is 11 to 26 RBs, the terminal device determines that the frequency-domain resource scheduling granularity is $$N_{RB} \text{ or } \left\lfloor \frac{N_{RB}}{2} \right\rfloor RBs;$$

when the system bandwidth is 27 to 63 RBs, the terminal device determines that the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the terminal device determines that the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $\lfloor \; \rfloor$ represents rounding down, and $N_{RB}$ is a quantity of RBs included in the system bandwidth. For uplink data transmission, $N_{RB}$ is a quantity of RBs included in an uplink system bandwidth. For downlink data transmission, $N_{RB}$ is a quantity of RBs included in a downlink system bandwidth.

Optionally, the terminal device may determine the frequency-domain resource scheduling granularity according to at least one of the following rules:

when the available short-TTI data transmission bandwidth is less than or equal to 10 RBs, the terminal device determines that the frequency-domain resource scheduling granularity is $N_{RB}$ RBs; when the available short-TTI data transmission bandwidth is 11 to 26 RBs, the terminal device determines that the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the terminal device determines that the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the terminal device determines that the frequency-domain resource scheduling granularity is $$\left\lfloor \frac{N_{RB}}{4} \right\rfloor \text{ or } \left\lfloor \frac{N_{RB}}{5} \right\rfloor RBs.$$

$\lfloor \ \rfloor$ represents rounding down. $N_{RB}$ is a quantity of RBs included in the available short-TTI data transmission bandwidth. For uplink data transmission, $N_{RB}$ is a quantity of RBs included in an available uplink short-TTI data transmission bandwidth. For downlink data transmission, $N_{RB}$ is a quantity of RBs included in an available downlink short-TTI data transmission bandwidth.

A method for determining, by the terminal device, the frequency-domain resource scheduling granularity needs to be the same as the method used by the base station. In this way, it can be ensured that the frequency-domain resource scheduling granularity determined by the terminal device is the same as the frequency-domain resource scheduling granularity determined by the base station, and further, the terminal device and the base station perform the short-TTI data transmission on a same frequency-domain transmission resource.

For the method for determining, by the terminal device, the frequency-domain resource scheduling granularity, refer to the method used by the base station in Embodiment 1, and details are not described herein again.

After determining the frequency-domain resource scheduling granularity, the terminal device may determine the frequency-domain transmission resource in one of the following manners, and the frequency-domain transmission resource occupies one or more frequency-domain resource scheduling granularities. A manner used by the terminal device needs to be same as the manner used by the base station, to ensure that the frequency-domain transmission resource determined by the terminal device is the same as the frequency-domain transmission resource determined by the base station. Optionally, a specific used manner may be agreed on by means of a protocol, or may be notified by the base station to the terminal device by using higher layer signaling or physical layer signaling.

Manner 1 (corresponding to the manner 1 of determining, by the base station, the frequency-domain transmission resource in Embodiment 1)

The terminal device determines that a size of the frequency-domain transmission resource is the same as a size of the frequency-domain resource scheduling granularity, and determines that an starting RB of the frequency-domain transmission resource is a reference RB.

The reference RB is the $n^{th}$ (n is an integer, and preferably, n=0) RB following the first RB occupied by the DCI or the $m^{th}$ (m is an integer greater than or equal to 0, and preferably, m=1) RB following the last RB occupied by the DCI.

In the manner 1, an information bit that is used to indicate the frequency-domain transmission resource and that is in the DCI may be null. That is, the DCI may not include an information bit used to explicitly indicate the frequency-domain transmission resource, but the terminal device can still determine the used frequency-domain transmission resource according to the DCI.

Manner 2 (corresponding to the manner 2 of determining, by the base station, the frequency-domain transmission resource in Embodiment 1)

The terminal device determines that a size of the frequency-domain transmission resource is the same as a size of the frequency-domain resource scheduling granularity, and determines a location of the frequency-domain transmission resource.

For example, a downlink system bandwidth is 20 MHz (including 100 RBs), and the frequency-domain resource scheduling granularity is 20 RBs. Then, the base station may use three bits to indicate an starting location of the frequency-domain transmission resource. There are only five possibilities (an RB number is 0, 20, 40, 60, or 80) for the frequency-domain starting location, and three bits may indicate eight states. For example, '000' represents that the frequency-domain starting location is an RB whose RB number is 0, and '010' represents that the frequency-domain starting location is an RB whose RB number is 40.

In the manner 2, the DCI may include information used to indicate the location of the frequency-domain transmission resource, and the terminal device determines the starting location of the frequency-domain transmission resource according to the information.

Manner 3 (corresponding to the manner 3 of determining, by the base station, the frequency-domain transmission resource in Embodiment 1)

The terminal device determines that an starting RB of the frequency-domain transmission resource is a reference RB, and determines a size of a bandwidth occupied by the frequency-domain transmission resource (that is, a length of the frequency-domain transmission resource).

The reference RB is the $n^{th}$ (n is an integer, and preferably, n=0) RB following the first RB occupied by the DCI or the $m^{th}$ (m is an integer greater than or equal to 0, and preferably, m=1) RB following the last RB occupied by the DCI.

A definition of the reference RB may be agreed on by means of a protocol, or may be notified by the base station to the terminal device by using higher layer signaling or physical layer signaling.

The frequency-domain transmission resource may be continuous. For example, a downlink system bandwidth is 20 MHz (including 100 RBs), and the frequency-domain resource scheduling granularity is 20 RBs. In this case, the base station may use three bits to indicate a frequency-domain length. There are only five possibilities (20, 40, 60, 80, or 100) for the frequency-domain length, and three bits may indicate eight states. For example, '000' represents that the length of the frequency-domain transmission resource is 20 RBs, and '010' represents that the length of the frequency-domain transmission resource is 60 RBs.

In the manner 3, the DCI may include information used to indicate the size of the bandwidth occupied by the frequency-domain transmission resource, and the information may be generated by the terminal device according to the frequency-domain resource scheduling granularity. The terminal device may determine, according to the information and the frequency-domain resource scheduling granularity, the size of the bandwidth occupied by the frequency-domain transmission resource.

Manner 4 (corresponding to the manner 4 of determining, by the base station, the frequency-domain transmission resource in Embodiment 1)

The terminal device determines that the frequency-domain transmission resource is multiple transmission resource groups included in the system bandwidth, for example, several resource block groups (RBG).

The DCI may include information used to indicate locations, in the system bandwidth, of the several transmission resource groups included in the frequency-domain transmission resource.

For example, the base station determines the resource block groups (RBG) occupied by the frequency-domain transmission resource, and indicates the occupied RBGs by means of bit mapping. In this case, the frequency-domain resource scheduling granularity is an RBG. In this solution, the DCI includes bitmap information. For example, a downlink system bandwidth is 20 MHz (including 100 RBs), and the frequency-domain resource scheduling granularity is 20 RBs. In this case, the base station may use five bits to indicate the used RBGs. For example, '00001' represents that the first RBG is occupied, and '01111' represents that the first to the fourth RBGs are occupied. The terminal device may determine, according to the 5-bit indication information, the RBGs occupied by the frequency-domain transmission resource.

The terminal device may first determine the time-domain transmission resource, and then determine the frequency-domain transmission resource; or may first determine the frequency-domain transmission resource, and then determine the time-domain transmission resource; or may determine the frequency-domain transmission resource and the time-domain transmission resource at the same time.

In S413, the terminal device performs the data transmission with the base station on the determined data transmission resource.

For downlink short-TTI data transmission, the terminal device receives a downlink short-TTI data packet on the data transmission resource.

For uplink short-TTI data transmission, the terminal device sends an uplink short-TTI data packet on the data transmission resource.

Embodiment 3

FIG. 5 is a schematic structural diagram of a base station according to Embodiment 3. As shown in FIG. 5, the base station includes:

a processing module 501, configured to determine a data transmission resource, where the data transmission resource is a short-TTI data transmission resource, and the short-TTI data transmission resource is less than a length of one subframe or is less than 1 ms in time domain; and a transceiver module 502, configured to: send DCI to a terminal device, where the DCI is used to indicate the data transmission resource; and perform data transmission with the terminal device on the data transmission resource.

For a definition of the short-TTI data transmission resource, refer to Embodiment 1.

Optionally, the data transmission resource includes a time-domain transmission resource, and the processing module 501 is specifically configured to:

determine a time-domain pattern, and select, from multiple time-domain elements included in the determined time-domain pattern, one time-domain element as the time-domain transmission resource; or determine an starting symbol and a quantity of symbols of the time-domain transmission resource.

For an optional solution in which the processing module 501 determines the time-domain pattern, and selects, from the multiple time-domain elements included in the determined time-domain pattern, one time-domain element as the time-domain transmission resource, refer to processing performed by the base station in Embodiment 1.

For an optional solution in which the processing module 501 determines the starting symbol and the quantity of symbols of the time-domain transmission resource, refer to the processing performed by the base station in Embodiment 1. The following describes the optional implementation.

Optionally, the processing module 501 is specifically configured to:

determine the time-domain pattern according to a system bandwidth, where a higher system bandwidth indicates a smaller quantity of symbols included in the selected time-domain element included in the time-domain pattern; or determine the time-domain pattern according to an available short-TTI data transmission bandwidth, where a higher available short-TTI data transmission bandwidth indicates a smaller quantity of symbols included in the selected time-domain element included in the time-domain pattern, and the available short-TTI data transmission bandwidth is a bandwidth that can be occupied by the short-TTI data transmission resource.

Optionally, in the time-domain pattern:

each subframe includes two time-domain elements, a first time-domain element is located in the first slot, a second time-domain element is located in the second slot, and the time-domain elements do not include a symbol occupied by a legacy PDCCH; or each subframe includes four time-domain elements; for a normal cyclic prefix CP, a first time-domain element is a set of symbols whose sequence numbers are {#0, #1, #2, #3}, a second time-domain element includes a set of symbols whose sequence numbers are {#4, #5, #6}, a third time-domain element is a set of symbols whose sequence numbers are {#7, #8, #9, #10}, and a fourth time-domain element is a set of symbols whose sequence numbers are {#11, #12, #13}; for an extended CP, every three consecutive symbols form one time-domain element, a first time-domain element is a set of symbols whose sequence numbers are {#0. #1, #2}, a second time-domain element is a set of symbols whose sequence numbers are {#3, #4, #5}, a third time-domain element is a set of symbols whose sequence numbers are {#6, #7, #8}, and a fourth time-domain element is a set of symbols whose sequence numbers are {#9, #10, #11}; and the time-domain elements do not include a symbol occupied for transmitting a PDCCH; or for a normal CP, each subframe includes seven time-domain elements, and every two consecutive symbols form one time-domain element; for an extended CP, each subframe includes six time-domain elements, and every two consecutive symbols form one time-domain element; and the time-domain elements do not include a symbol occupied by a legacy PDCCH.

Optionally, the processing module 501 is specifically configured to:

use a reference symbol as the starting symbol of the time-domain transmission resource, where the reference symbol is the first symbol occupied by the DCI, the last symbol occupied by the DCI, the $k^{th}$ symbol following the first symbol occupied by the DCI, or the $k^{th}$ symbol following the last symbol occupied by the DCI, and k is a positive integer; and determine, according to the system bandwidth, the quantity of symbols of the time-domain transmission resource, where a higher system bandwidth indicates a smaller quantity of occupied symbols; or determine, according to the available short-TTI data transmission bandwidth, the quantity of symbols of the time-domain transmission resource, where a higher available short-TTI data transmission bandwidth indicates a smaller quantity of occupied symbols, and the available short-TTI data transmission bandwidth is the bandwidth that can be occupied by the short-TTI data transmission resource.

Optionally, an information bit that is used to indicate the time-domain transmission resource and that is in the DCI is null.

The foregoing describes an optional solution in which the processing module 501 determines the time-domain transmission resource, and the following describes an optional solution in which the processing module 501 determines a frequency-domain transmission resource. For processing performed by the processing module 501, refer to processing performed by the base station in Embodiment 1.

Optionally, the data transmission resource includes a frequency-domain transmission resource, and the processing module 501 is specifically configured to:

determine that the frequency-domain transmission resource is the system bandwidth or the available short-TTI data transmission bandwidth, where the available short-TTI data transmission bandwidth is the bandwidth that can be occupied by the short-TTI data transmission resource.

Optionally, the data transmission resource includes the frequency-domain transmission resource;

the processing module 501 is further configured to: before determining the data transmission resource, determine a frequency-domain resource scheduling granularity, where the frequency-domain resource scheduling granularity is a minimum frequency-domain resource allocation unit used when the base station schedules the terminal device to perform the data transmission, and includes at least one resource block RB; and the processing module 501 is specifically configured to determine the frequency-domain transmission resource according to the frequency-domain resource scheduling granularity.

Optionally, the processing module 501 is specifically configured to:

determine the frequency-domain resource scheduling granularity according to the system bandwidth, where the frequency-domain resource scheduling granularity satisfies at least one of the following rules:

when the system bandwidth is less than or equal to 10 RBs, the frequency-domain resource scheduling granularity is $N_{RB}$ RBs; when the system bandwidth is 11 to 26 RBs, the frequency-domain resource scheduling granularity is $$N_{RB} \text{ or } \left\lfloor \frac{N_{RB}}{2} \right\rfloor RBs;$$

when the system bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the system bandwidth.

Optionally, the processing module 501 is specifically configured to:

determine the frequency-domain resource scheduling granularity according to the available short-TTI data transmission bandwidth, where the available short-TTI data transmission bandwidth is the bandwidth that can be occupied by the short-TTI data transmission resource; and the frequency-domain resource scheduling granularity satisfies at least one of the following rules:

when the available short-TTI data transmission bandwidth is less than or equal to 10 RBs, the frequency-domain resource scheduling granularity is $N_{RB}$ RBs; when the available short-TTI data transmission bandwidth is 11 to 26 RBs, the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the available short-TTI data transmission bandwidth.

Optionally, the processing module 501 is specifically configured to:

use a size of the frequency-domain resource scheduling granularity as a size of the frequency-domain transmission resource; and use a reference RB as an starting resource block RB of the frequency-domain transmission resource, where the reference RB is the $m^{th}$ RB following the first RB occupied by the DCI or the $m^{th}$ RB following the last RB occupied by the DCI, and m is an integer greater than or equal to 0.

Optionally, an information bit that is used to indicate the frequency-domain transmission resource and that is in the DCI is null.

Optionally, the processing module 501 is specifically configured to use a size of the frequency-domain resource scheduling granularity as a size of the frequency-domain transmission resource, where the DCI includes information used to indicate a location of the frequency-domain transmission resource.

Optionally, the processing module 501 is specifically configured to use a reference RB as an starting RB of the frequency-domain transmission resource, where the reference RB is the $m^{th}$ RB following the first RB occupied by the DCI or the $m^{th}$ RB following the last RB occupied by the DCI, and m is an integer greater than or equal to 0; and the DCI includes information used to indicate a size of a bandwidth occupied by the frequency-domain transmission resource.

Optionally, the processing module 501 is further configured to: before determining the data transmission resource, when at least one of the following conditions is satisfied, determine that the data transmission resource used to perform the data transmission with the terminal device is a short-TTI data transmission resource:

a latency requirement of a service currently used by the terminal device is less than a specified latency threshold; or the system bandwidth is greater than a specified bandwidth threshold.

Optionally, the transceiver module 502 is further configured to:

after the processing module 501 determines that the data transmission resource used to perform the data transmission with the terminal device is the short-TTI data transmission resource, and before the processing module 501 determines the data transmission resource, send higher layer signaling or physical layer signaling to the terminal device, to indicate to the terminal device that:

the data transmission resource used to perform the data transmission between the base station and the terminal device is the short-TTI data transmission resource.

For optional implementations of the higher layer signaling and the physical layer signaling, refer to the corresponding descriptions in Embodiment 1.

For an optional implementation solution in which the processing module 501 determines that the data transmission resource used to perform the data transmission with the terminal device is the short-TTI data transmission resource, refer to related processing performed by the base station in Embodiment 1.

Optionally, the processing module 501 is further configured to: before determining the data transmission resource, determine the available short-TTI data transmission resource; and the transceiver module 502 is further configured to: after the processing module 501 determines the available short-TTI data transmission resource, and before the processing module 501 determines the data transmission resource, send, to the terminal device, information indicating the available short-TTI data transmission resource.

Because there are multiple TTI-based data transmission modes in a system, the processing module 501 needs to determine the available short-TTI data transmission resource. The available short-TTI data transmission resource may include a frequency-domain bandwidth that can be occupied by the short-TTI data transmission and/or a time-domain resource that can be occupied by the short-TTI data transmission. The frequency-domain bandwidth that can be occupied by the short-TTI data transmission may be briefly referred to as an "available short-TTI data transmission bandwidth". The available short-TTI data transmission bandwidth is a frequency-domain resource that can be occupied by the short-TTI data transmission resource.

For a manner of multiplexing between the available short-TTI data transmission resource and another available transmission resource, for example, a data transmission resource with a TTI of 1 ms, information related to the short-TTI data transmission resource, and a HARQ time sequence, refer to the corresponding descriptions in Embodiment 1, and details are not described herein again.

For another optional implementation of the base station provided in Embodiment 3, refer to processing performed by the base station in Embodiment 1. Specifically, the processing module 501 is configured to perform a processing operation performed by the base station, and the transceiver module 502 may be configured to perform a receive/transmit operation performed by the base station.

FIG. 6 shows an optional implementation of the base station. The processing module 501 may be implemented by using a processor 601 in FIG. 6, and the transceiver module 502 may be implemented by using a transceiver 602 in FIG. 6. A bus architecture may include any quantity of interconnected buses and bridges, and specifically connects together circuits that are of one or more processors represented by the processor 601 and of a memory represented by a memory 603. The bus architecture may further connect various other circuits of a peripheral device, a voltage regulator, a power management circuit, and the like. This is well known in the art, and therefore, no further description is provided in this specification. A bus interface provides an interface. The transceiver 602 may be multiple components, that is, include a transmitter and a receiver, and provide a unit configured to communicate with other apparatuses on a transmission medium. For a different base station, a user interface 604 may further be an interface that can externally and internally connect to required devices, and the connected devices include but are not limited to a keypad, a display, a speaker, a microphone, and a joystick.

FIG. 7 shows another optional implementation of the base station. The processing module 501 may be implemented by using a processor 701 in FIG. 7, and the transceiver module 502 may be implemented by using a transceiver 702 in FIG. 7.

Embodiment 4

FIG. 8 is a schematic structural diagram of a terminal device according to Embodiment 4. As shown in FIG. 8, the terminal device includes:

a transceiver module 802, configured to receive DCI sent by a base station, where the DCI is used to indicate a data transmission resource; and a processing module 801, configured to determine the data transmission resource according to the DCI, where the data transmission resource is a short-TTI data transmission resource, and the short-TTI data transmission resource is less than a length of one subframe or is less than 1 ms in time domain, where the transceiver module 802 is further configured to perform data transmission with the base station on the data transmission resource.

For a definition of the short-TTI data transmission resource, refer to Embodiment 1.

For an optional solution in which the processing module 801 determines a time-domain pattern, and selects, from multiple time-domain elements included in the determined time-domain pattern, one time-domain element as a time-domain transmission resource, refer to processing performed by the terminal device in Embodiment 2.

For an optional solution in which the processing module 801 determines an starting symbol and a quantity of symbols of the time-domain transmission resource, refer to the processing performed by the terminal device in Embodiment 2. The following describes the optional implementation.

Optionally, the data transmission resource includes the time-domain transmission resource, and the processing module 801 is specifically configured to:

determine the time-domain pattern, and determine, according to the DCI and in the multiple time-domain elements included in the determined time-domain pattern, one time-domain element as the time-domain transmission resource; or determine, according to the DCI, the starting symbol and the quantity of symbols of the time-domain transmission resource.

Optionally, the processing module 801 is specifically configured to:

if the data transmission is downlink data transmission, determine that a time-domain element occupied by the DCI is the time-domain transmission resource; or if the data transmission is uplink data transmission, determine that a time-domain element in which the $k^{th}$ symbol following the first symbol occupied by the DCI or the $k^{th}$ symbol following the last symbol occupied by the DCI is located is the time-domain transmission resource.

Optionally, the processing module 801 is specifically configured to:

determine the time-domain pattern according to a system bandwidth, where a higher system bandwidth indicates a smaller quantity of symbols included in the time-domain element included in the determined time-domain pattern; or determine the time-domain pattern according to an available short-TTI data transmission bandwidth, where a higher available short-TTI data transmission bandwidth indicates a smaller quantity of symbols included in the time-domain element included in the determined time-domain pattern, and the available short-TTI data transmission bandwidth is a bandwidth that can be occupied by the short-TTI data transmission resource.

Optionally, in the time-domain pattern:

each subframe includes two time-domain elements, a first time-domain element is located in the first slot, a second time-domain element is located in the second slot, and the time-domain elements do not include a symbol occupied by a legacy PDCCH; or each subframe includes four time-domain elements; for a normal cyclic prefix CP, a first time-domain element includes a set of symbols whose sequence numbers are {#0, #1, #2, #3}, a second time-domain element includes a set of symbols whose sequence numbers are {#4, #5, #6}, a third time-domain element includes a set of symbols whose sequence numbers are {#7, #8, #9, #10}, and a fourth time-domain element includes a set of symbols whose sequence numbers are {#11, #12, #13}; for an extended CP, every three consecutive symbols form one time-domain element, a first time-domain element includes a set of symbols whose sequence numbers are {#0, #1, #2}, a second time-domain element includes a set of symbols whose sequence numbers are {#3, #4, #5}, a third time-domain element includes a set of symbols whose sequence numbers are {#6, #7. #8}, and a fourth time-domain element includes a set of symbols whose sequence numbers are {#9, #10, #11}; and the time-domain elements do not include a symbol occupied for transmitting a PDCCH; or for a normal CP, each subframe includes seven time-domain elements, and every two consecutive symbols form one time-domain element; for an extended CP, each subframe includes six time-domain elements, and every two consecutive symbols form one time-domain element; and the time-domain elements do not include a symbol occupied by a legacy PDCCH.

Optionally, the processing module 801 is specifically configured to:

determine that the starting symbol of the time-domain transmission resource is a reference symbol, where the reference symbol is the first symbol occupied by the DCI, the last symbol occupied by the DCI, the $k^{th}$ symbol following the first symbol occupied by the DCI, or the $k^{th}$ symbol following the last symbol occupied by the DCI, and k is a positive integer; and determine, according to the system bandwidth, the quantity of symbols of the time-domain transmission resource, where a higher system bandwidth indicates a smaller quantity of occupied symbols; or determine, by the terminal device according to the available short-TTI data transmission bandwidth, the quantity of symbols of the time-domain transmission resource, where a higher available short-TTI data transmission bandwidth indicates a smaller quantity of occupied symbols, and the available short-TTI data transmission bandwidth is the bandwidth that can be occupied by the short-TTI data transmission resource.

Optionally, an information bit that is used to indicate the time-domain transmission resource and that is in the DCI is null.

The foregoing describes an optional solution in which the processing module 801 determines the time-domain transmission resource, and the following describes an optional solution in which the processing module 801 determines a frequency-domain transmission resource. For processing performed by the processing module 801, refer to processing performed by the terminal device in Embodiment 2.

Optionally, the data transmission resource includes the frequency-domain transmission resource, and the processing module 801 is specifically configured to:

determine that the frequency-domain transmission resource is the system bandwidth or the available short-TTI data transmission bandwidth, where the available short-TTI data transmission bandwidth is the bandwidth that can be occupied by the short-TTI data transmission resource.

Optionally, the data transmission resource includes the frequency-domain transmission resource;

the processing module 801 is further configured to: before determining the data transmission resource, determine a frequency-domain resource scheduling granularity, where the frequency-domain resource scheduling granularity is a minimum frequency-domain resource allocation unit used when the base station schedules the terminal device to perform the data transmission, and includes at least one resource block RB; and the processing module 801 is specifically configured to determine the frequency-domain transmission resource according to the frequency-domain resource scheduling granularity and the DCI.

Optionally, the processing module 801 is specifically configured to:

determine the frequency-domain resource scheduling granularity according to the system bandwidth, where the frequency-domain resource scheduling granularity satisfies at least one of the following rules:

when the system bandwidth is less than or equal to 10 RBs, the frequency-domain resource scheduling granularity is $N_{RB}$ RBs; when the system bandwidth is 11 to 26 RBs, the frequency-domain resource scheduling granularity is $$N_{RB} \text{ or } \left\lfloor \frac{N_{RB}}{2} \right\rfloor RBs;$$

when the system bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the system bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where $N_{RB}$ is a quantity of RBs included in the system bandwidth.

Optionally, the processing module 801 is specifically configured to determine the frequency-domain resource scheduling granularity according to the available short-TTI data transmission bandwidth, where the available short-TTI data transmission bandwidth is the bandwidth that can be occupied by the short-TTI data transmission resource; and the frequency-domain resource scheduling granularity satisfies at least one of the following rules:

when the available short-TTI data transmission bandwidth is less than or equal to 10 RBs, the frequency-domain resource scheduling granularity is $N_{RB}$ RBs; when the available short-TTI data transmission bandwidth is 11 to 26 RBs, the frequency-domain resource scheduling granularity is $$N_{RB} \text{ or } \left\lfloor \frac{N_{RB}}{2} \right\rfloor RBs;$$

when the available short-TTI data transmission bandwidth is 27 to 63 RBs, the frequency-domain resource scheduling granularity is $$\left\lfloor \frac{N_{RB}}{2} \right\rfloor \text{ or } \left\lfloor \frac{N_{RB}}{3} \right\rfloor \text{ or } \left\lfloor \frac{N_{RB}}{4} \right\rfloor RBs;$$

or when the available short-TTI data transmission bandwidth is 64 to 110 RBs, the frequency-domain resource scheduling granularity is $$\left\lfloor \frac{N_{RB}}{4} \right\rfloor \text{ or } \left\lfloor \frac{N_{RB}}{5} \right\rfloor RBs,$$

where NR is a quantity of RBs included in the available short-TTI data transmission bandwidth.

Optionally, the processing module 801 is specifically configured to:

determine that a size of the frequency-domain transmission resource is the same as a size of the frequency-domain resource scheduling granularity; and determine that an starting resource block RB of the frequency-domain transmission resource is a reference RB, where the reference RB is the $m^{th}$ RB following the first RB occupied by the DCI or the $m^{th}$ RB following the last RB occupied by the DCI, and m is an integer greater than or equal to 0.

Optionally, an information bit that is used to indicate the frequency-domain transmission resource and that is in the DCI is null.

Optionally, the processing module 801 is specifically configured to:

determine that a size of the frequency-domain transmission resource is the same as a size of the frequency-domain resource scheduling granularity; and determine, according to information that is used to indicate a location of the frequency-domain transmission resource and that is included in the DCI, the location of the frequency-domain transmission resource.

Optionally, the processing module 801 is specifically configured to:

determine that an starting RB of the frequency-domain transmission resource is a reference RB, where the reference RB is the $m^{th}$ RB following the first RB occupied by the DCI or the $m^{th}$ RB following the last RB occupied by the DCI, and m is an integer greater than or equal to 0; and determine, according to information that is used to indicate a size of a bandwidth occupied by the frequency-domain transmission resource and that is included in the DCI, the size of the bandwidth occupied by the frequency-domain transmission resource.

Optionally, the transceiver module 802 is further configured to: before the processing module 801 determines the data transmission resource, receive higher layer signaling or physical layer signaling that is sent by the base station, where the signaling indicates to the terminal device that the data transmission resource used to perform the data transmission with the base station is the short-TTI data transmission resource; and the processing module 801 is further configured to determine, according to the higher layer signaling or the physical layer signaling, that the data transmission resource used to perform the data transmission with the base station is the short-TTI data transmission resource.

Optionally, the transceiver module 802 is further configured to: before the processing module 801 determines the data transmission resource, receive information that is about the available short-TTI data transmission resource and that is sent by the base station; and the processing module 801 is further configured to determine the available short-TTI data transmission resource according to the information.

For optional implementations of the higher layer signaling and the physical layer signaling, refer to the corresponding descriptions in Embodiment 1.

Because there are multiple TTI-based data transmission modes in a system, the base station needs to determine the available short-TTI data transmission resource. The available short-TTI data transmission resource may include a frequency-domain bandwidth that can be occupied by the short-TTI data transmission and/or a time-domain resource that can be occupied by the short-TTI data transmission. The frequency-domain bandwidth that can be occupied by the short-TTI data transmission may be briefly referred to as an "available short-TTI data transmission bandwidth". The available short-TTI data transmission bandwidth is a frequency-domain resource that can be occupied by the short-TTI data transmission resource.

For a manner of multiplexing between the available short-TTI data transmission resource and another available transmission resource, for example, a data transmission resource with a TTI of 1 ms, information related to the short-TTI data transmission resource, and a HARQ time sequence, refer to the corresponding descriptions in Embodiment 1, and details are not described herein again.

For another optional implementation of the terminal device provided in Embodiment 4, refer to processing performed by the terminal device in Embodiment 2. Specifically, the processing module 801 is configured to perform a processing operation performed by the terminal device, and the transceiver module 802 may be configured to perform a receive/transmit operation performed by the terminal device.

FIG. 9 shows an optional implementation of the terminal device. The processing module 801 may be implemented by using a processor 901 in FIG. 9, and the transceiver module 802 may be implemented by using a transceiver 902 in FIG. 9. A bus architecture may include any quantity of interconnected buses and bridges, and specifically connects together circuits that are of one or more processors represented by the processor 901 and of a memory represented by a memory 903. The bus architecture may further connect various other circuits of a peripheral device, a voltage regulator, a power management circuit, and the like. This is well known in the art, and therefore, no further description is provided in this specification. A bus interface provides an interface. The transceiver 902 may be multiple components, that is, include a transmitter and a receiver, and provide a unit configured to communicate with other apparatuses on a transmission medium. For a different terminal device, a user interface 904 may further be an interface that can externally and internally connect to required devices, and the connected devices include but are not limited to a keypad, a display, a speaker, a microphone, and a joystick.

FIG. 10 shows another optional implementation of the terminal device. The processing module 801 may be implemented by using a processor 1001 in FIG. 10, and the transceiver module 802 may be implemented by using a transceiver 1002 in FIG. 10.

Embodiment 5

FIG. 11 is a schematic structural diagram of a wireless communications system according to an embodiment of the present invention. As shown in FIG. 11, the wireless communications system includes a base station 1101 and a terminal device 1102.

The base station 1101 is configured to: determine a data transmission resource, where the data transmission resource is a short-TTI data transmission resource, and the short-TTI data transmission resource is less than a length of one subframe or is less than 1 ms in time domain; send DCI to the terminal device 1102, where the DCI is used to indicate the data transmission resource; and perform data transmission with the terminal device 1102 on the data transmission resource.

The terminal device 1102 is configured to: receive the DCI sent by the base station 1101; determine the data transmission resource according to the DCI; and perform the data transmission with the base station 1101 on the data transmission resource.

For another optional implementation of the base station 1101, refer to processing performed by the base station provided in Embodiment 1, and for another optional implementation of the terminal device 1102, refer to processing performed by the terminal device provided in Embodiment 2.

To sum up, in the embodiments of the present invention, because the data transmission resource is the short-TTI data transmission resource, a transmission time interval is shortened, a quantity of times of scheduling per unit time can be increased for one terminal device, and a data transmission latency can be effectively reduced.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, and an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A device, comprising:
   at least one processor;
   one or more memories coupled to the at least one processor and storing programming instructions for execution by the at least one processor to:
      determine a short transmission time interval data transmission resource, wherein the short transmission time interval data transmission resource comprises a time-domain transmission resource and a frequency-domain transmission resource, and wherein the short transmission time interval data transmission resource is less than 1 millisecond (ms) in time domain; and
   a transceiver configured to:
      send downlink control information (DCI) to a terminal device, wherein the DCI comprises information indicating the time-domain transmission resource; and
      perform data transmission with the terminal device on the short transmission time interval data transmission resource; wherein:
   determining the short transmission time interval data transmission resource comprises determining a starting symbol and a quantity of symbols of the time-domain transmission resource;
   the DCI indicates the starting symbol and the quantity of symbols of the time-domain transmission resource; and
   the starting symbol of the time-domain transmission resource is determined based on a position of a symbol occupied by the DCI.

2. The device according to claim 1, wherein:
   the programming instructions are for execution by the at least one processor to:
      configure a frequency hopping rule; and
      determine frequency-domain transmission resources on different symbols according to the frequency hopping rule; and
   the transceiver is further configured to send signaling indicating the frequency hopping rule to the terminal device.

3. The device according to claim 1, wherein no information bit in the DCI indicates the frequency-domain transmission resource.

4. A device, comprising:
   a transceiver, the transceiver configured to receive downlink control information (DCI) from a base station, wherein the DCI comprises information indicating a time-domain transmission resource;
   at least one processor; and
   one or more memories coupled to the at least one processor and storing programming instructions for execution by the at least one processor to:
      determine the time-domain transmission resource according to the DCI; and
   wherein the transceiver is further configured to perform data transmission with the base station on a short transmission time interval data transmission resource, wherein the short transmission time interval data transmission resource is less than 1 millisecond (ms) in time domain, and wherein the short transmission time interval data transmission resource comprises the time-domain transmission resource and a frequency-domain transmission resource;
   wherein determining the time-domain transmission resource according to the DCI comprises determining, according to the DCI, a starting symbol and a quantity of symbols of the time-domain transmission resource; and
   wherein the starting symbol of the time-domain transmission resource is determined based on a position of a symbol occupied by the DCI.

5. The device according to claim 4, wherein:
   the transceiver is further configured to receive signaling indicating a frequency hopping rule; and
   the programming instructions are for execution by the at least one processor to determine frequency-domain transmission resources on different symbols according to the frequency hopping rule.

6. The device according to claim 4, wherein no information bit in the DCI indicates the frequency-domain transmission resource.

7. A data transmission method, comprising:
   determining a short transmission time interval data transmission resource, wherein the short transmission time interval data transmission resource comprises a time-domain transmission resource and a frequency-domain transmission resource, and wherein the short transmission time interval data transmission resource is less than 1 millisecond (ms) in time domain;
   sending downlink control information (DCI) to a terminal device, wherein the DCI comprises information indicating the time-domain transmission resource; and
   performing data transmission with the terminal device on the short transmission time interval data transmission resource; wherein:
      determining the short transmission time interval data transmission resource comprises determining a starting symbol and a quantity of symbols of the time-domain transmission resource;
      the DCI indicates the starting symbol and the quantity of symbols of the time-domain transmission resource; and
      the starting symbol of the time-domain transmission resource is determined based on a position of a symbol occupied by the.

8. The method according to claim 7, further comprising:
   configuring a frequency hopping rule;
   determining frequency-domain transmission resources on different symbols according to the frequency hopping rule; and
   sending signaling indicating the frequency hopping rule to the terminal device.

9. The method according to claim 7, wherein no information bit in the DCI indicates the frequency-domain transmission resource.

10. A data transmission method, comprising: receiving downlink control information (DCI) from a base station, wherein the DCI comprises information indicating a time-domain transmission resource;
   determining the time-domain transmission resource according to the DCI; and
   performing data transmission with the base station on a short transmission time interval data transmission resource, wherein the short transmission time interval data transmission resource comprises the time-domain transmission resource and a frequency-domain transmission resource, and wherein the short transmission time interval data transmission resource is less than 1 millisecond (ms) in time domain;

wherein determining the time-domain transmission resource according to the DCI comprises determining, according to the DCI, a starting symbol and a quantity of symbols of the time-domain transmission resource; and wherein the starting symbol of the time-domain transmission resource is determined based on a position of a symbol occupied by the DCI.

11. The method according to claim 10, further comprising:

receiving signaling indicating a frequency hopping rule; and determining frequency-domain transmission resources on different symbols according to the frequency hopping rule.

12. The method according to claim 10, wherein no information bit in the DCI indicates the frequency-domain transmission resource.

13. A non-transitory computer-readable storage medium comprising instructions which, when executed by a computer, cause the computer to:

determine a short transmission time interval data transmission resource, wherein the short transmission time interval data transmission resource comprises a time-domain transmission resource and a frequency-domain transmission resource, and wherein the short transmission time interval data transmission resource is less than 1 millisecond (ms) in time domain;

send downlink control information (DCI) to a terminal device, wherein the DCI comprises information indicating the time-domain transmission resource; and perform data transmission with the terminal device on the short transmission time interval data transmission resource; wherein:

determining the short transmission time interval data transmission resource comprises determining a starting symbol and a quantity of symbols of the time-domain transmission resource;

the DCI indicates the starting symbol and the quantity of symbols of the time-domain transmission resource; and the starting symbol of the time-domain transmission resource is determined based on a position of a symbol occupied by the DCI.

14. A non-transitory computer-readable storage medium comprising instructions which, when executed by a computer, cause the computer to:

receive downlink control information (DCI) from a base station, wherein the DCI comprises information indicating a time-domain transmission resource;

determine the time-domain transmission resource according to the DCI; and perform data transmission with the base station on a short transmission time interval data transmission resource, wherein the short transmission time interval data transmission resource comprises the time-domain transmission resource and a frequency-domain transmission resource, and wherein the short transmission time interval data transmission resource is less than 1 millisecond (ms) in time domain;

wherein determining the time-domain transmission resource according to the DCI comprises determining, according to the DCI, a starting symbol and a quantity of symbols of the time-domain transmission resource; and wherein the starting symbol of the time-domain transmission resource is determined based on a position of a symbol occupied by the DCI.

15. The device of claim 1, wherein the starting symbol of the time-domain transmission resource is a first symbol occupied by the DCI, a last symbol occupied by the DCI, a $k^{th}$ symbol following the first symbol occupied by the DCI, or a $k^{th}$ symbol following the last symbol occupied by the DCI, and k is a positive integer.

16. The device of claim 4, wherein the starting symbol of the time-domain transmission resource is a first symbol occupied by the DCI, a last symbol occupied by the DCI, a $k^{th}$ symbol following the first symbol occupied by the DCI, or a $k^{th}$ symbol following the last symbol occupied by the DCI, and k is a positive integer.

17. The method of claim 7, wherein the starting symbol of the time-domain transmission resource is a first symbol occupied by the DCI, a last symbol occupied by the DCI, a $k^{th}$ symbol following the first symbol occupied by the DCI, or a $k^{th}$ symbol following the last symbol occupied by the DCI, and k is a positive integer.

18. The method of claim 10, wherein the starting symbol of the time-domain transmission resource is a first symbol occupied by the DCI, a last symbol occupied by the DCI, a $k^{th}$ symbol following the first symbol occupied by the DCI, or a $k^{th}$ symbol following the last symbol occupied by the DCI, and k is a positive integer.

19. The non-transitory computer-readable storage medium of claim 13, wherein the starting symbol of the time-domain transmission resource is a first symbol occupied by the DCI, a last symbol occupied by the DCI, a $k^{th}$ symbol following the first symbol occupied by the DCI, or a $k^{th}$ symbol following the last symbol occupied by the DCI, and k is a positive integer.

20. The non-transitory computer-readable storage medium of claim 14, wherein the starting symbol of the time-domain transmission resource is a first symbol occupied by the DCI, a last symbol occupied by the DCI, a $k^{th}$ symbol following the first symbol occupied by the DCI, or a $k^{th}$ symbol following the last symbol occupied by the DCI, and k is a positive integer.

* * * * *